US012479069B2

(12) United States Patent
Stouffer

(10) Patent No.: US 12,479,069 B2
(45) Date of Patent: Nov. 25, 2025

(54) MITER CLAMPING SYSTEM

(71) Applicant: Rodney Scott Stouffer, Phoenix, AZ (US)

(72) Inventor: Rodney Scott Stouffer, Phoenix, AZ (US)

( * ) Notice: Subject to any disclaimer, the term of this patent is extended or adjusted under 35 U.S.C. 154(b) by 270 days.

(21) Appl. No.: 18/089,507

(22) Filed: Dec. 27, 2022

(65) Prior Publication Data

US 2023/0271303 A1 Aug. 31, 2023

Related U.S. Application Data

(63) Continuation-in-part of application No. 16/901,645, filed on Jun. 15, 2020, now Pat. No. 11,534,893, and a continuation-in-part of application No. PCT/US2018/065503, filed on Dec. 13, 2018.

(51) Int. Cl.
*B25B 5/00* (2006.01)
*B25B 5/14* (2006.01)
*B25B 11/00* (2006.01)

(52) U.S. Cl.
CPC .............. *B25B 5/145* (2013.01); *B25B 5/003* (2013.01); *B25B 11/007* (2013.01)

(58) Field of Classification Search
CPC ........... B25B 5/00; B25B 5/003; B25B 5/145; B25B 11/00; B25B 11/005
See application file for complete search history.

(56) References Cited

U.S. PATENT DOCUMENTS 3,174,188 A * 3/1965 Wood ...................... B29C 65/00 249/105
3,180,604 A 4/1965 Hammer
3,240,525 A 3/1966 Wood
4,236,703 A * 12/1980 Stevenson ............... B25B 5/142 269/53
5,639,082 A 6/1997 Pollich
5,704,599 A * 1/1998 Slothower ............. B25B 11/005 269/21
7,469,886 B2 * 12/2008 Shen ..................... B25B 11/005 269/21
9,651,084 B1 5/2017 Livingston, Jr. et al.
11,534,893 B2 * 12/2022 Stouffer .................. B25B 5/145
2004/0061270 A1 4/2004 McCormick
2006/0032037 A1 * 2/2006 Lo ..................... H01L 21/67126 269/21
2007/0216177 A1 9/2007 Liao
2021/0039228 A1 * 2/2021 Stouffer .................. B25B 5/142

OTHER PUBLICATIONS

90 Stealth Seamer™, Auto. Omnicubed. Oct. 27, 2017, (retrieved Apr. 29, 2019). Retrieved from the Internet <URL:https://omnicubed.com/index.php?route=product/product&product_id=291>.

* cited by examiner

*Primary Examiner* — Lee D Wilson

(74) *Attorney, Agent, or Firm* — Bycer & Marion, PLC; Matthew L. Bycer

(57) ABSTRACT

A clamping system and method useful in miter edge fabrication. Two separate units, each including a vacuum plate may be placed on separate slabs. The units may be connected with a knuckle that can be rotated to provide connection of the slabs in a variety of angles. The units are vacuum sealed to the slabs. The vacuum plates may include various sections of varied sizes to connect to different sized slabs. When the knuckle is locked, a worm gear will provide for lateral movement, relative the knuckle, to provide precision fitting of slabs.

16 Claims, 22 Drawing Sheets

MITER CLAMPING SYSTEM

CLAIM OF PRIORITY

The present continuation-in-part application includes subject matter disclosed in and claims priority to U.S. patent application Ser. No. 16/901,645, filed Jun. 15, 2020, entitled "Miter Clamping System" (now U.S. Pat. No. 11,534,893, issued Dec. 27, 2022); and to PCT patent application PCT/US18/65503 filed Dec. 13, 2018, entitled "Miter Clamping System" and incorporated herein by reference, and also provisional patent application entitled "Method for Positioning Perpendicular, Planar Materials by Means of a Portable Pneumatic Mitre Clamp Apparatus" filed Dec. 13, 2017 and assigned Ser. No. 62/708,556, all incorporated herein by reference, and which describe inventions made by the present inventor.

BACKGROUND OF THE INVENTION

1. Field of the Invention

The present invention generally relates to clamps. More specifically, it relates to a portable method for precisely aligning and firmly securing angled, mitered corners of planar materials.

2. Description of Related Prior Art

Granite, marble, and more so, their engineered quartz counter-parts, have become the most desired, specified, recommended and sold products of the counter top industry. Consumer demand for unique architectural applications of these products has given birth to new equipment, machinery and tools, as well as, alternative fabrication, material handling and installation methods.

One increasingly popular process of fabrication is the mitered or "waterfall" edge detail. Razor sharp mitered edges are cut by the most advanced CNC, bridge saw, water jet or robotic arm saw, but may also be cut by or if it is cut by hand with jigs or templates in small shops. The mitered edges are easily chipped or broken. When edges are joined, this method of fabrication requires the precision alignment and firm clamping of the two (often forty-five degree) mitered edges over the (relative ninety degree) corner edge they form (for a waterfall). This process often involves large, heavy sections of countertops (or generally slabs) and requires multiple workers to hold the sections in position, while more workers apply adhesive and place conventional bar clamps horizontally and vertically directly against both sharp edges of the mitered sections being joined. Many shops refrain from offering the mitered edge detail due to the manpower required and the catastrophic losses that can occur from the fabricators inability to re-align and securely clamp these seams before the rapid curing epoxy adhesive sets.

There are many variations of prior art designed to aid in the mitered edge fabrication process. One similar mitered edge clamping apparatus is the "90° Auto Stealth Seamer" (U.S. Pat. No. 9,651,084). This product utilizes large four inch round suction cups, a fixed ninety degree connector and claims to produce perpendicular seams without the use of straps or bar-clamps. The shortcomings of this system, include: 1) an additional apparatus required to compensate for the "outswing" of waterfall or mitered apron seams caused by its own normal operation; 2) added complexity of multiple additional suction cup attachments required to resist the inherent, unnoticeable "side slipping" ease of the suction cups potentially resulting in a failed seam, consequent loss of materials, labor, install deadlines, personal injury and collateral damage when the assumed secure stone section slams down; and 3) the inability to accommodate seam angles other than perpendicular ninety degrees.

Other clamping devices have various limitations such as rigid vacuum pads limited by 1) inability to clamp a mitered apron or waterfall larger than ten inches, 2) perpendicular operation, 3) unidirectional pressure, and 4) reliance on an extension bar against the sharp edge. Similar grip seam installation tools utilizing rigid vacuum pads may only secure horizontal seams. Other miter clamps known in the art utilize 1) unreliable lever actuated suction cups; 2) direct attachments against the sharp seam edge (obscuring visual inspection) 3) limited skirt sizes, etc.

Other systems known in the art include rigid bench mounted miter folding mechanisms that fold the mitered seam together, but fail to supply any other form of clamping force. None of the currently available mitered edge clamping systems incorporates an efficient and desirable ability to maintain and/or reposition alignment of multiple dry fit mitered pieces when disassembled for prep and application of seam adhesive. All of the prior art suffers a deficiency in disallowing a variety of angled approaches, are limited by the size of pieces that they can secure and often require additional stabilization by way of conventional bar clamps, straps or tape which dangerously contact the delicate sharp miter cuts at the seam.

As yet, there is still a need for a satisfactory tool or apparatus that is portable and universal, for managing, manipulating, and securely clamping a mitered seam, while reducing the manpower required, and the material loss associated, with this challenging countertop fabrication process. In recognition of an industry wide dilemma, the current invention is designed to provide efficiency and ease of operation.

It is therefore a primary object of the present invention to provide a clamping system that reduces fabrication time, man power, material loss, and personal injury.

It is another object of the present invention to reduce production time, and avoid chipped, broken or bruised seam edges.

Yet another object of the present invention is to limit man power needed, and increase the overall quality and efficiency of production.

It is another object of the present invention to provide a clamping system to securely attaches to, manipulates, and precision aligns mitered pieces for a precision dry fit.

A further object of the present invention to provide a clamping system and method to place and retract dry fit mitered pieces in place, without significant misalignment, for the purpose of cleaning the seam area and applying adhesive.

Still another object of the present invention to provide a clamping system and method to apply extreme pressure required across the mitered joints, such as to expel the excess adhesive for quality seams, etc.

These and other objects of the present invention will become apparent to those skilled in the art as the description thereof proceeds.

SUMMARY OF THE INVENTION

Specifically regarding the stone countertop manufacturing process known as mitered edge fabrication, the clamp provides for the simultaneous manipulation, alignment and dry fit securing of one or more mitered edge pieces by one worker. The clamp further provides for the retracting of said dry fit pieces for the purpose of cleaning the seam area and applying adhesive without any misalignment. As certain components and dimensions are used below, they are provided for illustrative purposes only, and should not be read as limiting or required for any embodiment of the invention that is able to accomplish the objects set forth herein.

The clamping system combines powerful unique features into a small efficient, safe and easy to use package. It offers diverse industries a reliable, precision method of securing smooth flat materials of all kinds to be installed or bonded together. The soft, ribbed "no footprint" lip seals of the vacuum base plate are preferably the only part of the clamping system to touch the subject material. Handles allow for carrying and positioning large, or small, pieces to reduce material damage, personal injury and fatigue. The clamping system allows application of significant pressure needed to achieve a tight, professional union of materials. A single fabricator can use one or more pairs of the clamping system to dry fit align all the pieces at once and then "retract" them apart for prep and application of the bonding adhesive. The fabricator can return the glued pieces to their position without any misalignment via an optional worm drive mechanism.

The drive mechanism automatically locks at the desired joint pressure. The pivoting knuckle assembly allows use of the clamping system at any angle between forty-five and two hundred-seventy degrees.

BRIEF DESCRIPTION OF THE DRAWINGS

The present invention will be described with greater detail and clarity with reference to the following drawings, in which.

DETAILED DESCRIPTION OF THE PREFERRED EMBODIMENTS

Figure 1:
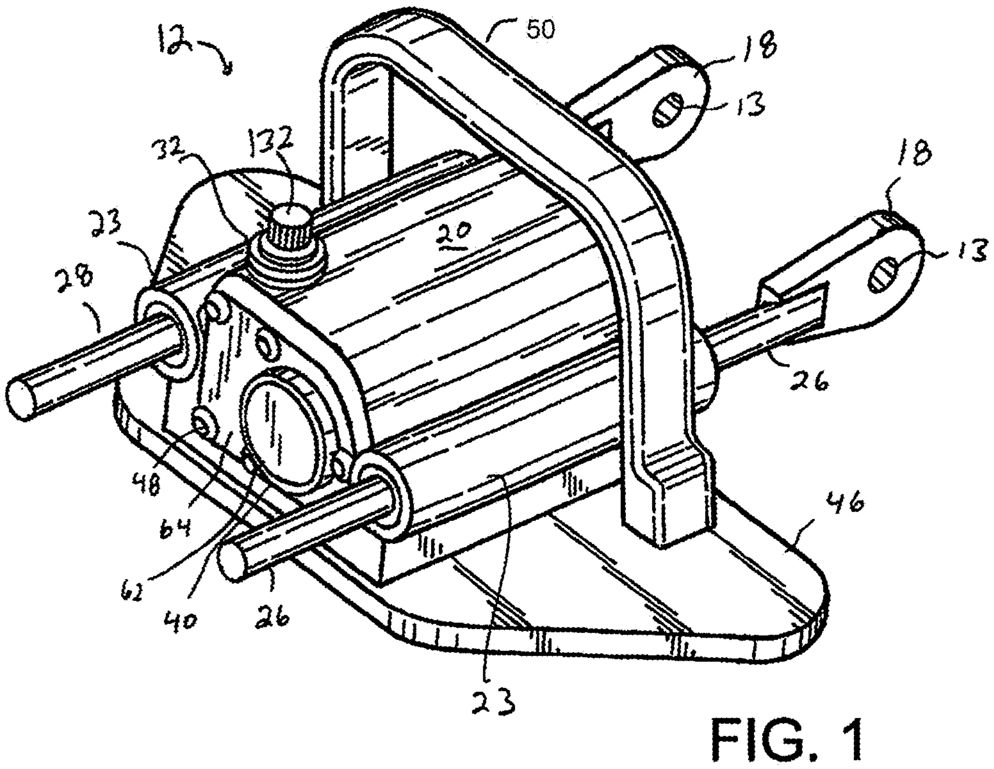
FIG. 1 illustrates a rear perspective view of an embodiment of the present invention.
Figure 2:
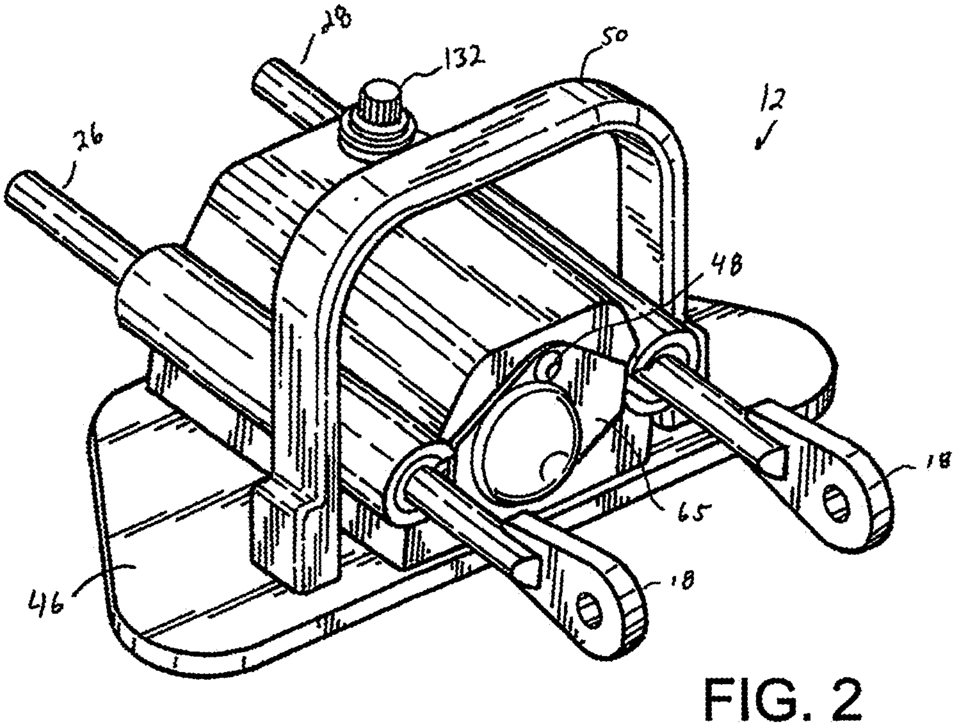
FIG. 2 illustrates a front perspective view of an embodiment of the present invention.
Figure 3:
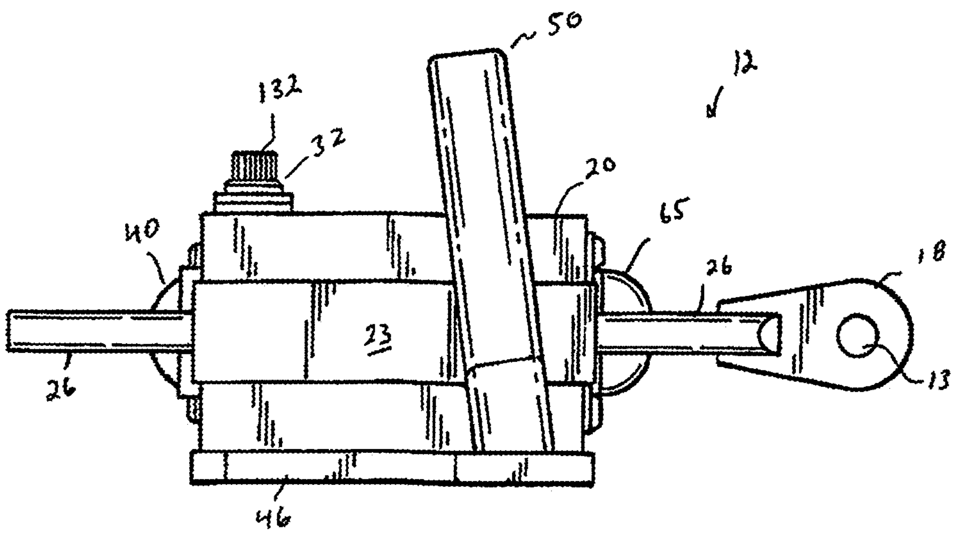
FIG. 3 illustrates a side view of an embodiment of the present invention.
Figure 4:
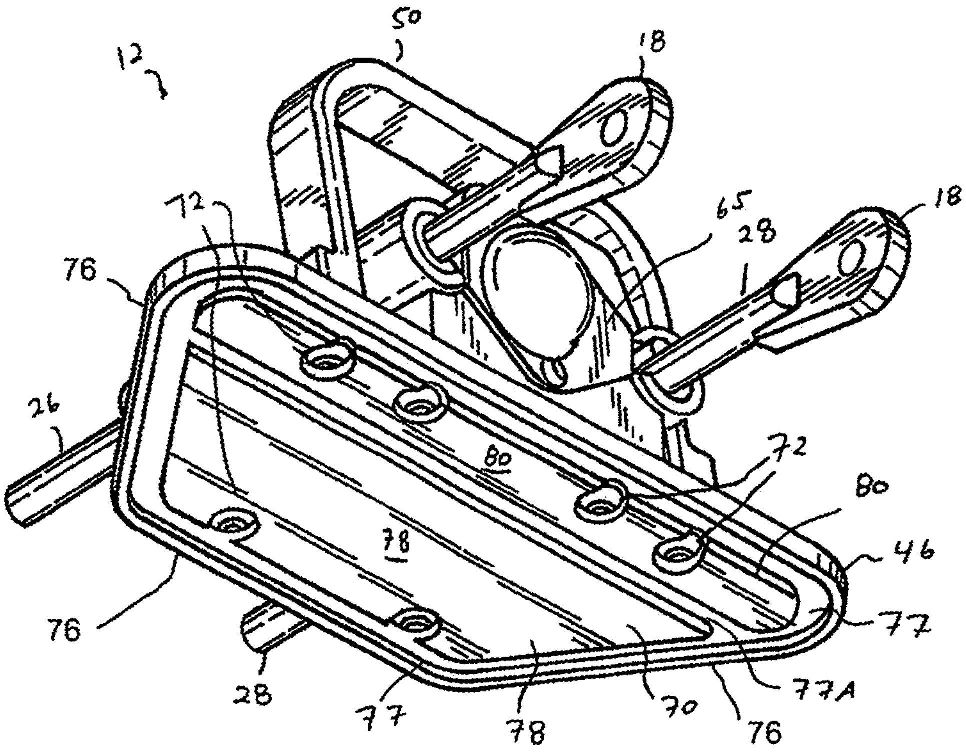
FIG. 4 illustrates an underside frontal perspective view of an embodiment of the present invention.

The clamping system of the present invention has diverse industrial potential for use with materials such as stone, solid surface, wood, glass, metal, tile and more (generally referred to as slabs). The clamping system of the present invention firmly secures to the subject material with a near "zero footprint" rigid vacuum plate (as opposed to standard suction cups, etc.) to allow for the simultaneous precision dry fit of mitered pieces. Fit pieces can be expanded, or moved, apart without damage or misalignment for cleaning and gluing. In production of corners, the system can secure all three mitered pieces of a corner finished end detail. The knuckles may adjust to any desired angle between forty five and two hundred seventy degrees as between the units and/or vacuum plates. The system may be equipped with a handle bar on each unit for safe easy material handling by only one worker. The system may secure mitered edge pieces as small as one-and-one-half inches tall, and as large as full slabs as are known in the art. The system may adapt for use as standard flat field seam clamp with optional leveling accessory kit. The system may allow for easy fabrication of unique architectural shapes and designs, inward finished angles, pentagon, hexagon or octagon pillars and many other configurations.

The system may also use threaded fastening holes for expansion, accessories and alternative industry uses. Unfiltered compressed air may be used to generate sufficient vacuum pressure, or an optional AC/battery powered standalone vacuum pump.

The clamping system may include three main component systems:

1. vacuum base plates, hereinafter referred to as the "base plates";
2. a pivoting, connecting knuckle assembly, hereinafter referred to as the "knuckle"; and
3. a drive mechanism, preferably installed within a gear block, the drive mechanism preferably a worm drive mechanism (as is known in the art), hereinafter referred to as the "gear block".

1. Base Plates

The base plates of the clamping system employ negative pressure of a vacuum to attach to the subject material. The system preferably utilizes two identical base plates joined by the knuckle. The base plates are preferably trapezoidal shaped. The base plates are most preferably isosceles trapezoids with internal angles of forty-five degrees and one hundred-thirty-five degrees (give or take ten degrees). The angle of the base plate allows for two plates to be aligned an offset at a right angle, so that a corner can be properly aligned with a pair of base plates over each corner. The base plate includes a bottom surface that may be bisected into two adjacent sections, each section including a cavity adapted to allow vacuum connection to the slab. The sections may be separated by a single section of the lip seal, so as to isolate each of the cavities for optional concurrent use, and isolated use when vacuum to one side is optionally released, allowing the first cavity to remain in vacuum and attached to a slab, for instance when a slim material is being used.

In a most preferred embodiment, by way of example, the long length dimension is thirteen inches, the width is five inches and the height (thickness) is five sixteenths of an inch. The ends of the plates form the trapezoid shape with forty-five degree angles that meet the long side with one inch radius corners. The bottom surface of the base plates may be machined with a three-eighths inch wide by one-eighth inch deep channel around the perimeter, one eighth of an inch from the outer edge. Another channel, of the same dimensions, may be machined through the length of the bottom surface at one & one-half inches from the long edge of the base plates. The channels provide space for a lip seal to be set therein. The lip seal thereby fits into the channel to provide cavities, and then mates with a flat surface of the slab to isolate chambers for vacuum application.

These channels divide the bottom surface of the base plates to provide two separate vacuum chambers. It is preferred that the small chamber of the vacuum plate be in continuous fluid contact with the vacuum source, While the large vacuum plate chamber may be alternatively shut on/off. A three-eighths inch wide, ribbed, ethylene polypropylene diene monomer (EPDM), self-adhesive, triple ribbon as lip seal is securely installed into the channels. The lip seal functions to seat against the surface of the work material (or slab) when vacuum pressure is applied. The base plates also may have two threaded holes from the top surface through the bottom surface in locations specific to best serve the function of mounting a push-release adapter fitting into the upper, narrow vacuum chamber and a push-release shut-off valve adapter into the lower, larger vacuum chamber on the top surface of the base plates. This is a unique feature to the clamping system as it allows the operator to disengage the vacuum pressure to the lower, large vacuum chamber by means of shutting off the valve. This enables one to secure work pieces as small as one and one half inches tall. This is a common countertop drop edge dimension usually produced by stack lamination, which often does not allow for color patterns and veining of the material to align and continue through the edge detail as is desired by consumers and designers.

Stack laminated edge detail fabrication often produces an undesirable, unsightly horizontal shift of noticeable pattern change that significantly degrades the overall beauty of the installation. With the present invention, the fabricator can easily dry fit align the color patterns and veining with a mitered drop edge detail as small as one-and-one-half inches tall. The base plates further may have attached "C" shaped handle bar for operating and manipulating the clamping system and the subsequent, vacuum attached, subject material to be joined or bonded. The handle bar is ergonomic, being centrally located and permanently attached at both ends of the top surface of base plates adjacent to the outer edge. The handle may be mounted via gasket sealed screws through the base plate. The handle bar preferably protrudes at least five inches perpendicular from the base plate at both ends and spans the length of the base plate. The height of the cross section above the base plate allows proper clearance for the operator to firmly grip the handle bar over the gear block as it is mounted to the base plate.

The base plates may have two gear racks attached (offset by ninety-degrees) which enable the operator to adjust the clamp in a side-to-side manner relative to a fixedly coupled unit, as necessary to align the color patterns of the pieces being joined. Therefore, the vacuum chamber base plate allows the clamping system to securely attach to the subject material, and enables the operator to easily manipulate and position said materials.

2. Knuckle

The knuckle assembly of the clamping system physically joins together, for operational use, the two identical base plates. The knuckle may comprise two equal connecting bars (arms) with flat off-set portions (tabs) in a fashion where the off-set aligns the two identical base plates with each other when connected. The connecting bars may insert into the front of the gear box through slotted linear bearings, installed into parallel guide tubes. The linear bearings are preferably permanently attached to both sides of the gear box, most preferably in sleeves (as described and shown below). The linear bearing includes slot openings so as to allow space for the connecting bars to physically attach to the yoke of the gear box. The connecting bars preferably include a cavity to allow nubs of the yoke to fit therein and drive the bars through the linear bearings. The connecting bars may have a half inch bore through the center of the flat portions (tabs). The knuckle may be made of a stainless steel, or similar material, spacer fixed between the connecting bars. The spacer may have large diameter ends which taper to a reduced diameter middle section. The spacer may also have a half-inch diameter bore through the center and be of an overall length to fit snug between the flat sections of the connecting bars whereas the center bore aligns with the bore holes of the flat sections.

The knuckle further includes a half-inch diameter, fine thread, hardened or stainless steel shoulder bolt/pin, preferably fit into the spacer, which is permanently fixed to a torque handle which protrudes outward in a perpendicular fashion. The said bolt/pin may be inserted through the connecting bar holes, and through the spacer, and may extend through the opposing connecting bars a sufficient distance to allow a fine thread, fender-style nut to thread onto the protruding portion of the bolt/pin. The described apparatus may form a pivoting hinge action between the directionally opposing connecting bars. The operator may lock the pivot action of the knuckle at any desired angle between forty-five and two hundred seventy degrees by means of tightening the apparatus via the torque handle on the bolt/pin. Similarly, the operator may unlock the pivot action by running the torque handle in an opposite direction to allow the knuckle to rotate the relative positions of the base plates. The knuckle should be robust in nature as it carries all of the weight and movement force of the attached subject materials being joined.

3. The Gear Block

The gear blocks of the present invention are preferably mounted to the base plates, and connected to the knuckle via arms, or connecting bars. The gear blocks include a drive mechanism to move the connecting bars linearly through the gear blocks and modify the distance from the gear block to the knuckle. The gear block may relate to common machine drive gear construction, and most preferably utilize a spiral worm drive gear commonly used in diverse industry machine construction. The use of a worm drive gear delivers several key features to the operation of the current invention in such that it has an incredible reduction ratio with the adjacent driven gear of one revolution of the worm drive gear transferring to one tooth of rotation of the driven gear. The worm drive gear further contributes to the overall operation of the current invention providing an instantaneous locking action of the adjacent connected driven gear rod. The worm drive gear effortlessly rotates the driven gear rod while the driven gear rod cannot turn the worm drive gear bolt, thus locking the transferred rotational action of the driven gear rod. The drive gear rod rotates, and thus transfers rotational movement of the rod to a yoke mounted thereupon. The yoke includes internal threads and acts as a nut (with fixed relative orientation) such that rotation of the rod causes the yoke to move back and forth on the rod. The yoke is fixed to the connecting bars, the connecting bars being fixed in linear bearings, and thus resists rotation with rod. The yoke is fixedly connected to the connecting bars via nubs into bar cavities, and thus rotation of the drive bolt causes rotation of the rod, which in turn forces the yoke (and fixed arms) to move laterally through the linear bearings. As the arms move, the position/distance of the gear block and base plate is changed relative to the knuckle. As the base plate is moved, the vacuum seal provides for movement of the slab relative to the knuckle. When the paired unit is held in place, this causes the slab to move apart from the knuckle.

The gear block is preferably a roughly rectangular box of approximately five inches long, six inches across the overall front, and three inches tall. The gear block may have angled down top corner edges which meet the parallel guide tubes (or sleeves). The guide tubes may be integral or otherwise permanently attached to the sides of the gear block, and expand the width (front to back) of the gear block. The gear block is preferably tough and lightweight, and may be constructed of aluminum, injection molded of reinforced plastic or similar. A cast body gear block is preferred as it may allow internal features, holes, and detail. Alternatively, the gear block may be machined to specification to include the vertical worm drive gear shaft support, the driven gear rod bearing support and various plumbing process and mounting details.

The gear block may be attached, centrally located, onto the top of the base plates via bolts (with vacuum seal to base plate) into insert nuts thru the bottom of the base plates. The gear block may be assembled in a fashion that transfers the rotary motion applied to the vertical shaft drive assembly into the linear motion of the aforementioned connecting bars via the worm drive mechanism. The gear block drive mechanism may comprise a vertical drive shaft assembly consisting of flange bushings installed into integral shaft assembly and may include thrust washers. The drive shaft bolt may be configured with a key-way slot to accept a set screw threaded thru the worm drive gear for the purpose of locking the gear to the shaft and further configured having a spiral snap ring groove at its bottom and a preferably twelve point bolt head protruding the top of the gear block. The bolt head is preferably the sole source of the rotational force which drives the action of the current invention as described herein.

The gear block may also be configured to support the mounting of the main acme thread driven shaft assembly (driven rod and fittings). The acme thread assembly way comprises a worm driven gear permanently fixed to the acme rod where the gear and shaft/rod are supported in position, so that the driven gear meshes physically with the worm drive gear by means of a flange ball bearing through the rear wall of the gear block. The bearing may be locked into place by a doomed cover plate bolted to the back side of the gear block. The drive mechanism, having the purpose of transferring rotation force into linear motion comprises an acme threaded yoke that may extend across the interior of the gear block and threads onto the acme shaft (otherwise referred to as the rod). Rotational force applied to the vertical worm drive shaft is transferred into horizontal rotational force via the interaction of the connected gears. The yoke, being threaded onto the acme shaft is moved forward and/or back by the subsequent rotation of the acme shaft. The yoke may extend across the entire width of the gear block so as to mate with the connecting bars. The yoke may be machined with protruding ends, or nubs, shaped to fit snug into inward facing cavities machined into connection bars of knuckle. The gear block may have linear bearings installed into each end of the guide tubes respectively, and may be secured into sleeves with set screws. The linear bearings perfectly suspend the connecting bars with the said cavities aligned (facing one another) to accept the protruding ends of the yoke. Therefore the gear block transfers rotational force applied to the worm drive shaft by the operator into the linear movement of the connecting bars and subsequent motion of the subject materials to be joined by means of the opposing base plate apparatus via the connecting knuckle.

The clamping system may then be used to control, manipulate and firmly secure the smooth, flat surface materials to which its connected base plates are attached.

An optional embodiment of the gear block may include two, equal slotted holes positioned parallel to the length of the base plates near the forward and rearward edges of the gear block. The gear block base may be attached to the base plate in a fashion that allows it to move side-to-side freely within the distance allowed by the slots by means of a spur gear shaft. The slotted holes align with threaded cavities and a gear rack mounted to the top surface of the base plates. The gear block may be mounted to the base plate with four shoulder bolts. The bolts may be installed through nylon flat washers and/or thrust washers (so as to maintain pressure seal), through the slotted holes in the bottom of the gear block and thread into aligned cavities on the base plate top surface.

Gear racks may be bolted to the top surface of the base plate so as to protrude up through the slotted holes in the gear block. The gear block may include a lower drive shaft mounted on sealed ball bearings at each end and may span the width (front to back) centered in the gear block. The drive shaft may be permanently fixed with two spur gears at each end positioned directly over the before mentioned gear racks and where the teeth of the these gears mesh contact with the teeth of the gear racks in an "oil damped" fashion which resists movement in either direction. The lower shaft may have a twelve point bolt head protruding the rearward wall of the gear block. Rotational force applied to the bolt head may be translated into side-to-side linear motion of the gear block, with the base plate, without compromising its fail safe attachment to the base plate. Thus, rotation of the bolt head can cause linear motion of the gear block and base plate (together) unit relative the knuckle and cause movement of the slab when the vacuum is applied.

The gear block is preferably machined to include all cavities, divots, drill holes and any other common machine gear box methods required for the assembly and mounting of all bearings, shafts, gears, springs or other components as is to be determined.

The operator may choose to use a standard manual ratchet tool, or a powered drill motor equipped with the appropriate (twelve point) socket as the source of rotation of the bolt. The aforementioned reduction ratio enables the operator of the clamping system to apply significant damping force to the joint with minimal effort utilizing the levering action of the gears, and possibly the ratchet. The connecting bar linear bearings may be positioned at a considerable distance above the surface of the subject material being joined (slab) so as to not impair visual inspection of the entire joint or interfere in the gluing process.

Another optional embodiment may include the use of a small drive motor fixed onto the bolt, which may connect to the vertical worm gear bolt head, to provide for automated movement of drive and arm extension/retraction. The motor may be mounted over housing, preferably on a back side, away from the handles. The motor may be remotely activated/controlled to allow for multiple clamp sets to be moved in unison, sequence, or as programmed. Additionally, when series of clamp sets are required, the line of clamps may all be simultaneously moved, such as to clamp or retract the subject materials in unison (or as otherwise desired).

4. Operation

In the process of fabricating a granite or quartz counter top project, a saw operator will attempt to lay-out the job pattern on the raw material slab in a manner that allows for the material needed to fabricate the front drop edge to be cut from the area of the slab directly adjacent to the front edge perimeter cuts of the project. This allows the fabricator to align the closest possible color, pattern and/or veining match to continue through the front edge detail. For example, a residential kitchen counter top client will request materiel veining be aligned through the front drop edge and the back-splash, the commercial reception desk client wants the materials color variants to flow across the top, around a configuration angle and continue down through the large front waterfall mitered fascia of the desk, the exterior architecture of a building will call for the material vein pattern to continue around the mitered sections of the large octagonal pillars, etc. These demands are often very challenging and difficult to meet. There are three major factors to consider. 1) The amount of material required to accommodate the desired look, 2) the skill and craftsmanship abilities of the fabricator to make the precise lay-out and cuts, and 3) a method, system or tool that would enable securely holding the pieces into the required configuration, at the same time, provide the ability to manipulate the slab pieces to precision align the material patterns in dry fit process. Then, allow the fabricator to separate the pieces for cleaning and applying epoxy without any misalignment and finally supply the means to apply the significant clamping pressure along the joints that is required to achieve the desired outcome of a virtuously seamless flowing pattern installation.

Once a few of the miter cuts are made, it is often necessary to dry fit the slab edges to verify alignment and measure the proper miter angle and dimensions of the next piece to be cut. As an example, fabricating an artistic display for a casino to produce a three foot cube mounted from one corner fabricated of a veined patterned quartz material to resemble a large dice. The fabricator would lay-out, label, and cut the slab in the fashion that each side would "fold" around the miter cut allowing the veining to continuously align around the cube. He would place one side piece face up on a two foot square work bench near the clamp rack. Using the offset gauge of the clamp set, the fabricator would align the clamp bases around the perimeter of the miter cut material piece at each corner. The in-line Venturi vacuum system would be set in fluid communication with a continuous compressed air line (pneumatic) to provide vacuum to mounted clamps through apertures into lower cavity(ies). The fabricator places, or presses firmly down on, each clamp base and verifies its secure attachment to the material. This piece gets turned face down on the work bench and this process is repeated with all other side pieces of the project. The knuckle mechanisms are all locked firmly (at ninety degree angles). The fabricator positions each side piece of the project, visually inspects all joints with no obscurity and adjusts all the sides into a dry fit alignment. The sections are then retracted allowing the fabricator to clean the seam area. Epoxy adhesive is applied to the seams and the fabricator quickly clamps all the sides of the cube before back into position and leaves them until the epoxy prematurely sets.

Very serious factors to consider are that wearing gloves is advised to prevent injury from the sharp edge, however, grip failure, with or without gloves could potentially result in severe lacerations of hands, any other body part that the falling sharp edges come in contact with and the complete amputation of the portion of feet it landed on. Fallen pieces result in breakage and the catastrophic loss of the entire project due to color match and veining alignment.

No boom lifting machinery, no additional personnel, no elaborate jigs, no additional time and materials in building a sub frame are required. The clamps are easily removed and the mitered seams are finished with standard fabrication methods known in the art.

A standard residential counter top project with a one-and-one-half inch mitered drop edge detail is effortlessly fabricated starting with not having to turn the heavy quartz pieces upside down. The clamping system is attached to the surface of the top using the offset template. The large vacuum chamber valve is closed on the clamp bases to be attached to the small edge pieces, then when attached are easily maneuvered into position with the handles. A complete dry fit is achieved, retracted, cleaned and glued in half the time required for standard fabrication techniques. Even more time, effort and finishing materials are saved in that only the miter seam needs tooling as opposed to the entire face of a laminated edge detail needing to be polished. In instances where sharper or broader angle (as opposed to ninety degrees) fit is desired, the clamps may simply be set with knuckle at the desired angle. The clamping system is not limited to ninety degree corners, but can accommodate the mating of two planar slabs at any angle.

In some embodiments, the drive mechanism is provided other than a worm drive. For instance, the present invention may allow for a variety of drive systems known in the art to provide for lateral movement of the connecting bars. For instance, a crank shaft may be employed, that circumvents needs for a ninety degree turned work drive, whereby the drive shaft is accessible from the rear face. Alternatively, a pneumatic pump piston may be used in place of drive shaft. The drive systems may be accessible on the face of the housing, or remotely accessible. When using a worm drive mechanism that locks where it stops and provides a reduction ratio for incredibly tight seam clamping. A controlled, dual chamber, rigid, zero footprint vacuum plate is preferably provided with triple rib EPDM seal. The system preferably includes a built in, reversible Venturi vacuum generator that operates from compressed air or external vacuum source through the same connecting coupler. The system may also employ a pivoting, locking, knuckle hinge that allows clamp operation at any desired angle between 40 and 280 degrees. Optional accessory extension plates may provide for vertical mitered edge clamping at finished end caps.

The clamping system has diverse potential uses. Though specifically designed for granite and quartz slab fabrication and installation, the unique operation and material manipulation features will prove beneficial to a multitude of common operations and industrial processes. Optional accessories that may be made available to complement the clamping system include a seam leveling attachment kit, and/or a forty-five degree bar clamp ramps for clamping short vertical mitered corners; The present invention can be better understood by illustration of drawings.

System 10 includes a first unit and a second unit. Each of the units includes both a base plate (or vacuum plate) 46 and a gear block (or housing) 20. First unit 12 and second unit 14 are joined via knuckle 16. Both first unit and second unit are preferably identical. Each of first unit and second unit include a base plate or vacuum plate for adhering to a flat surface. First unit and second unit are joined via knuckle to provide a rotating mount.

Referring now to FIGS. 1-4, 9-14, first unit 12 is shown. First unit includes first arm 26 and second arm 28 running through yokes 23. First arm and second arm act as connecting bars. Each of first arm and second arm include tabs 18, preferably offset, on one end—towards knuckle. Each of tabs 18 include aperture 13 to accept a shoulder bolt pin 19 (not shown) of the knuckle. First unit 12 also includes housing 20, housing preferably a unitary body, preferably with sleeves 23 integral or built thereon. On far end from tabs, housing includes face plate 64 including bearing retainer 40 and retaining dome 62 may be integral with face plate 64. Head screws 48 secure face plate 64 (and/or 62) onto housing.

Housing 20 is mounted to vacuum plate 46; similarly, handle 50 is preferably mounted onto vacuum plate 46 by means of screws through the vacuum plate. Handle is meant to allow for manipulation of first unit 12, application to a flat surface (not shown), and otherwise to carry unit, with or without slab. Arms 26 and 28 preferably are engagedly mounted within housing so as to provide for manipulation of the location of arms in housing via driven rod (or threaded shaft) 60, such as an acme threaded shaft. Rod 60 is preferably threaded, and allows for rotation of rod to cause mounted yoke 54 to move along rod 60 and thus cause arms to move back-and-forth in unison (depending on direction of rod rotation) to manipulate the length of arms on the knuckle end. It is preferred that rod 60 is connected to a worm gear within housing on a 1-to-16 or otherwise similar ratio wherein a single turn of drive bolt 32 translates into rotation so one rotation of rod moves arm approximately 1/16ths of an inch. With five threads per inch, 1/5 of an inch will be moved with sixteen turns of the bolt. This allows precision alignment. Other ratios could easily be used; however the important aspect is that one can use the drive bolt to modify arm length. Drive bolt 32 includes bolt head 132, also includes surface features e.g. as multi-point, preferably as described above) so as to allow for both manual hand ratchet, and power drill application to rotate drive bolt and cause lateral movement of arms. Opposite of face plate 64 on housing 20, front face plate 65 provides a cap that can be removed to access worm drive inside housing. Front face plate 65 is similarly mounted via screws 48. When interior face plate is removed, and end of rod is exposed, and space is provided for yoke to be completed moved off of rod (see FIG. 13). When yoke is disconnected (or screwed off) rod, the arms will become free of the housing. This will allow maintenance of the device, maintaining the unit on the slab, and/or application of auxiliary attachments to the arms or alternative arms.

Figure 5:
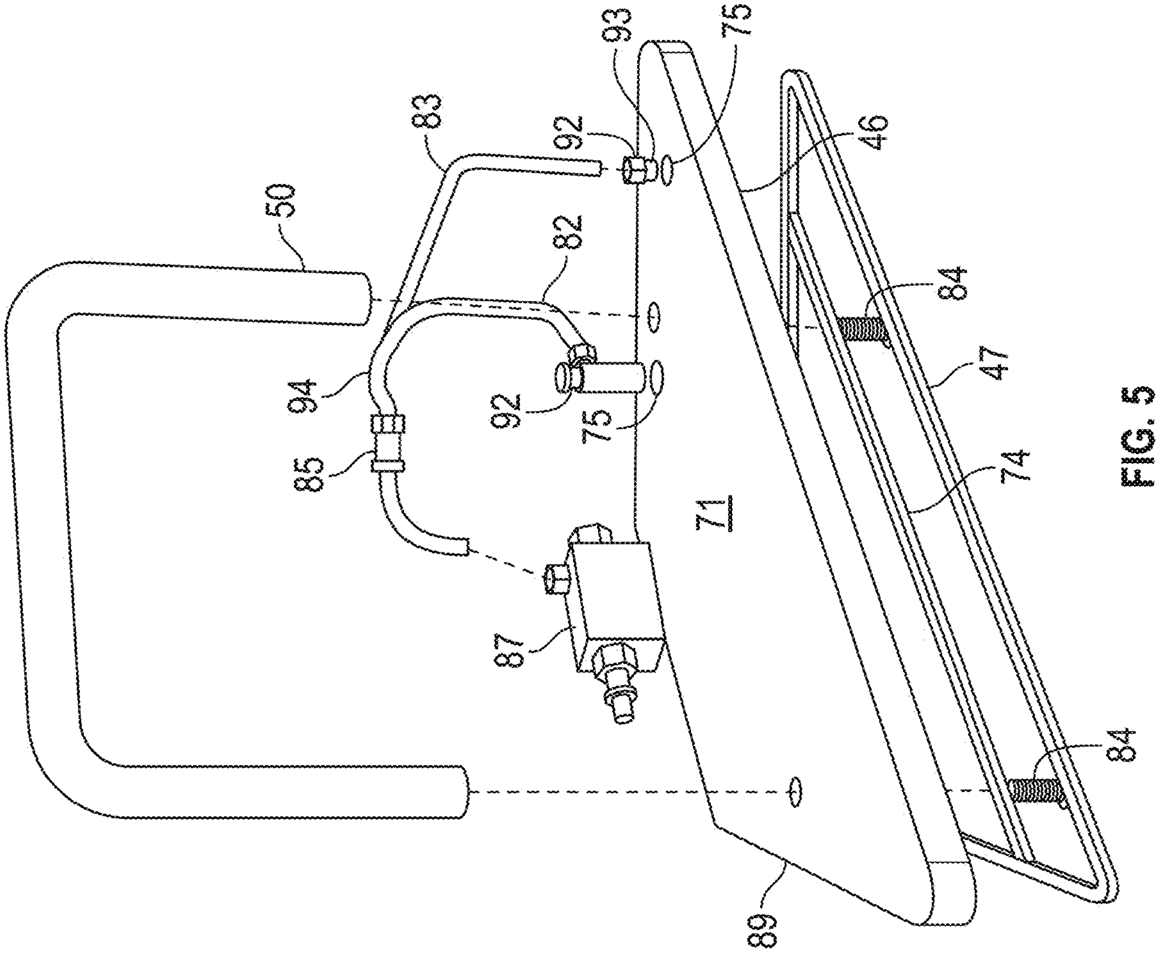
FIG. 5 illustrates an exploded front perspective view of an embodiment of the handle and vacuum plate (with tubing).
Figure 6:
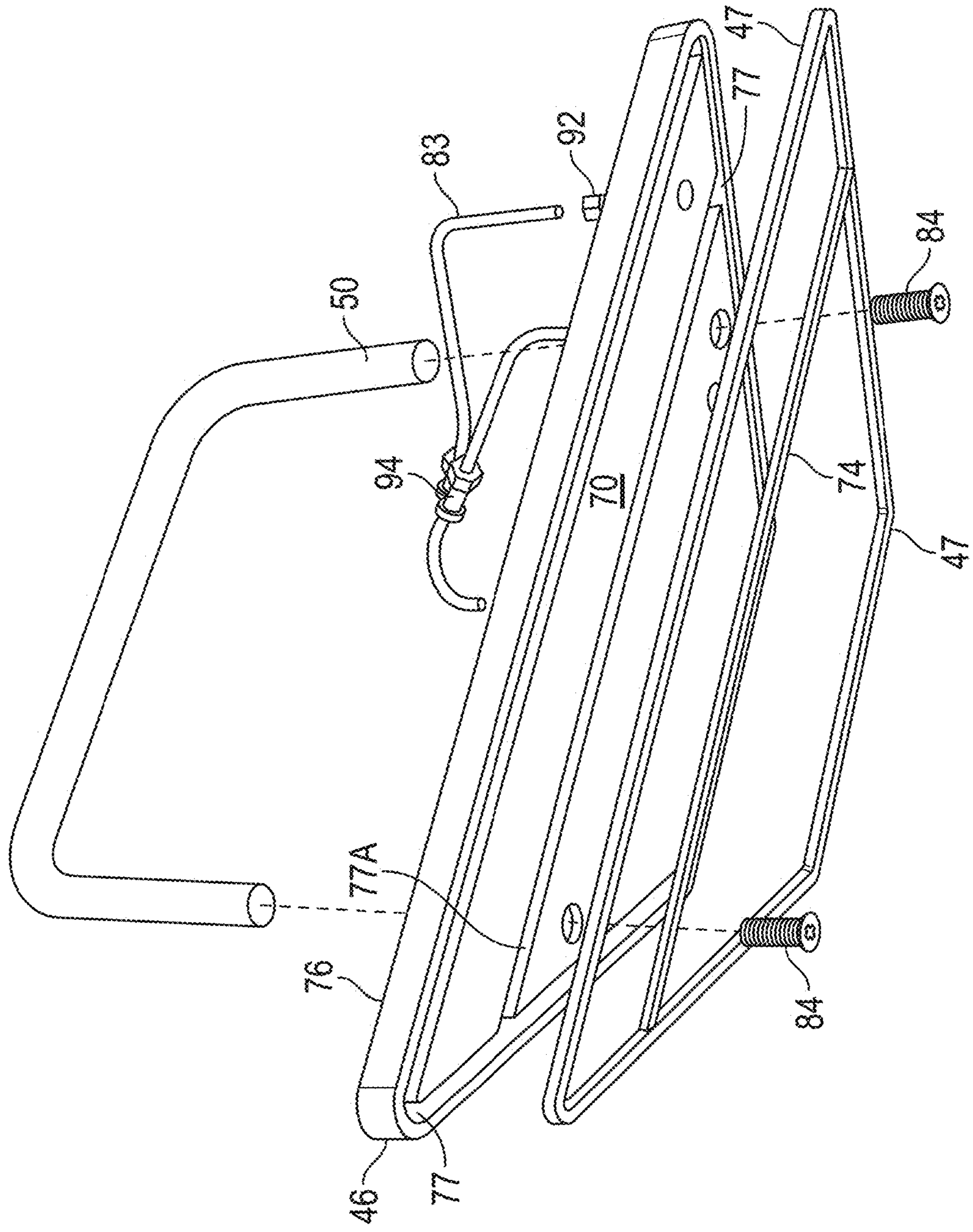
FIG. 6 illustrates an exploded front underside perspective view of an embodiment of the handle and vacuum plate (with tubing).

Vacuum plate 46 includes top side 71 that can accommodate a variety of fittings for vacuum tubing. Referring now to FIGS. 5-6, vacuum plate 46 allows for mounting of handle 50 onto plate upper surface 71. A vacuum ejector 87 may be provided coupled with vacuum plate 46 via tubing 83 vacuum ejector inside housing. Vacuum ejector preferably includes a Venturi so that coupling with a pneumatic pressure supply translates into vacuum forces through tubing. A check valve may be placed on vacuum ejector, such that an opposite pressure (vacuum) may also cause vacuum within the plate cavities. Tubing will be mounted onto top side 71 of vacuum plate via fittings 92 to provide for fluid communication from vacuum ejector to an underside of vacuum plate through fitting bore holes 93. Tubing may be bifurcated at fork 94 so as to provide for separate tubings to enter separate locations (and access separate cavities) on vacuum plate 46. A shutoff valve 82 may be provided to close off fluid communication from vacuum ejector to an underside of vacuum plate or otherwise regulate (and optionally release vacuum from one (preferably the large) cavity). This allows shutoff of one line so only the single tubing connected to a single cavity and fitting to access underside of plate through a single bore hole, as may be preferred when only single cavity vacuum is required (for instance when manipulating a smaller slab). Handle 50 may include recesses to accept handle mount screws 84 which can be applied through an underside of the vacuum plate and allow for mounting of handles thereon. Additionally, accessory mount bore holes 89 may be threaded and may be provided for additional accessories to be mounted onto vacuum plate 46.

A gasket or lip seal 47 may be applied to vacuum plate. Vacuum plate underside 70 includes air holes 72 (see FIG. 4) in channels in fluid communication through fittings to tubings to provide for vacuum onto underside of plate 70. Preferably, gasket 47 includes a circumferential, and preferably bisecting section, to provide for a complete two-dimensional seal, as well as optional two sections/cavities. Each of narrow cavity section 80 and large cavity section 78 includes apertures 75 to mate with fittings to provide for fluid communication with vacuum and vacuum ejector. Gasket seal 47 is fit into surface channels 77 on underside of vacuum plate, and vacuum plate underside provides a surrounding rim 76 to further maintain seal. Gasket seal 47 may include separation bar 74 to separate first and second large and narrow cavity sections. Separation bar 74 may fit in to a central surface channel 77A. Gasket seal may be ribbed. Shutoff valve 82 may be used to shut off vacuum access to first large cavity section and retain vacuum to second narrow cavity section on underside 70 of vacuum plate, so as to maintain and hold onto a narrow slab. Vacuum ejector 87 may be coupled to both tubing lines via coupling 85. Tubing may fork 94 from coupling 85 to provide for two separate air lines. Coupling may be screwed directly to vacuum input on ejector. In addition to handle mount screws, it is preferred that button head screws provide for mounting of housing onto top side 71 of vacuum plate 46.

Figure 7:
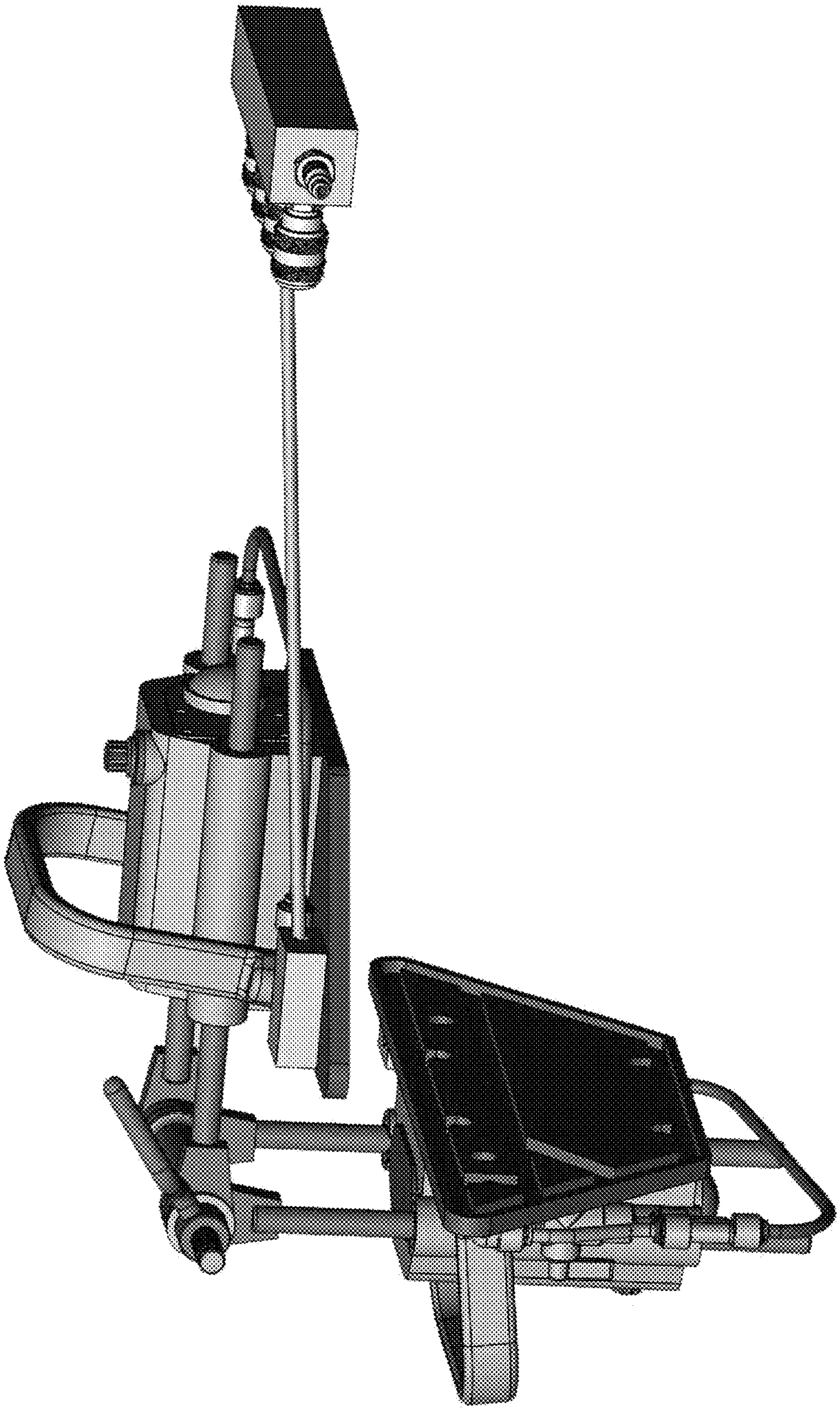
FIG. 7 illustrates a side view of a pair of units joined to a pneumatic as an embodiment of the present invention.
Figure 8:
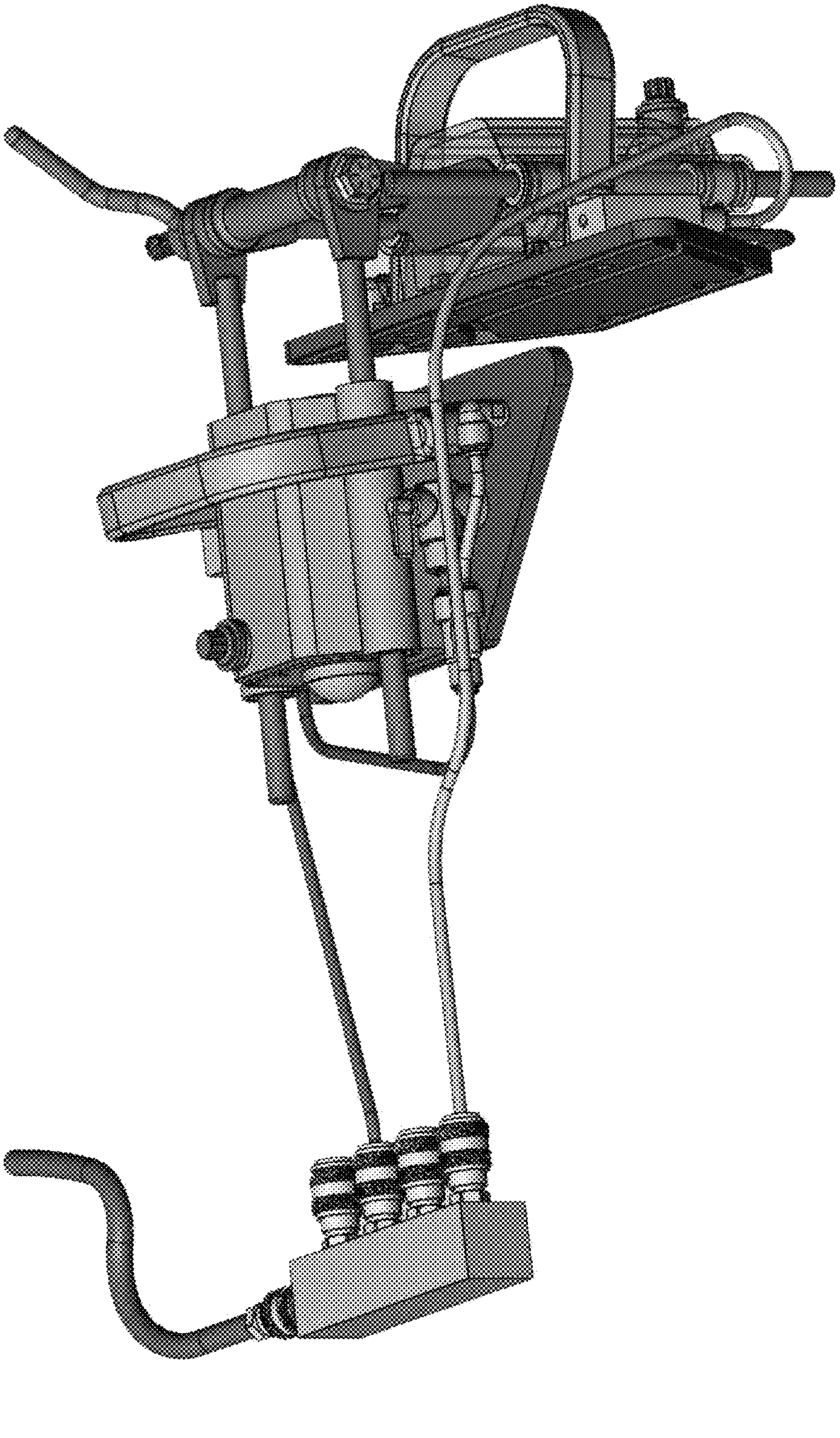
FIG. 8 illustrates a perspective view of a pair of units joined to a pneumatic as an embodiment of the present invention.
Figure 9:
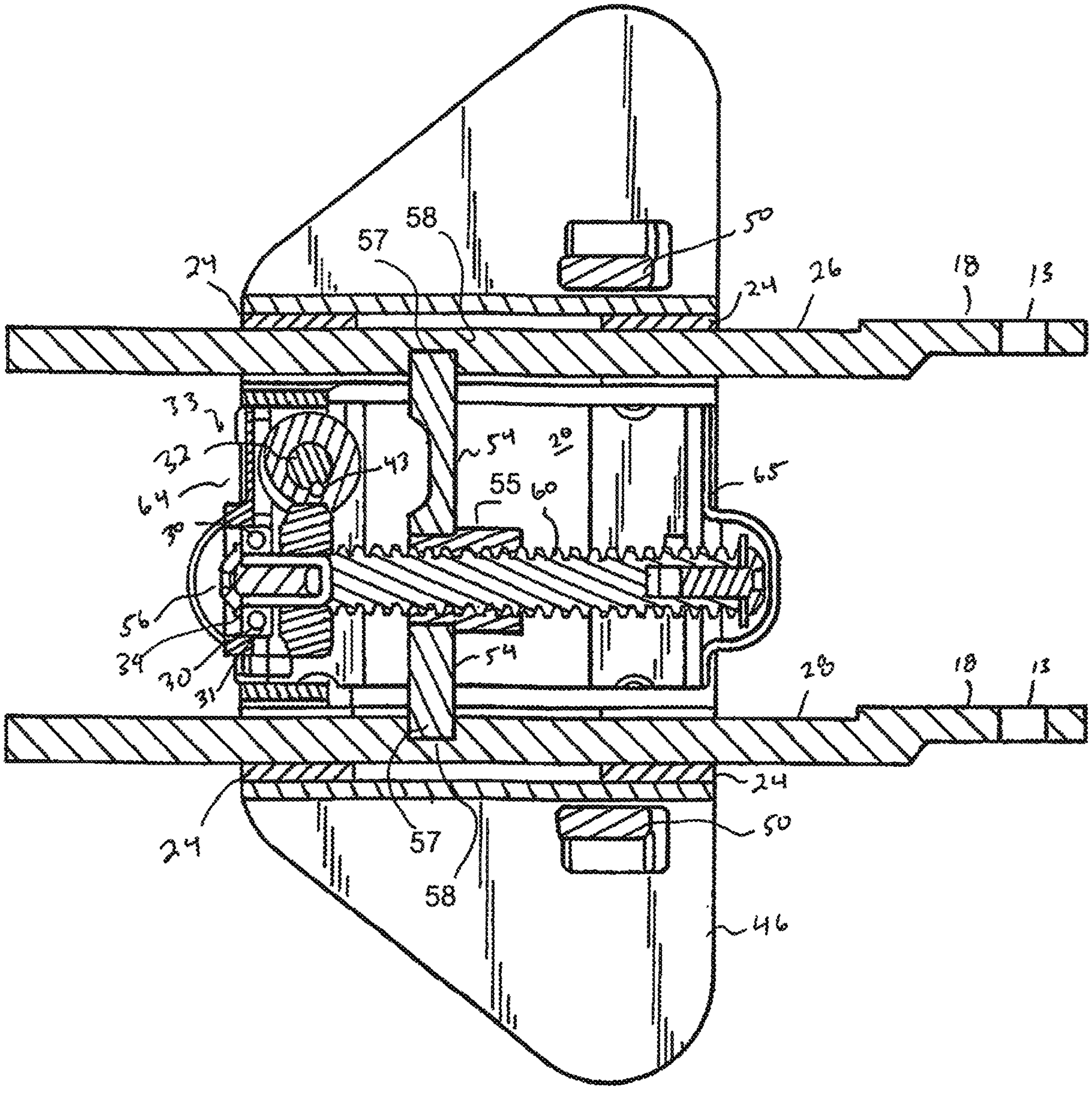
FIG. 9 illustrates a partially transparent bottom view of an embodiment of the present invention.
Figure 10:
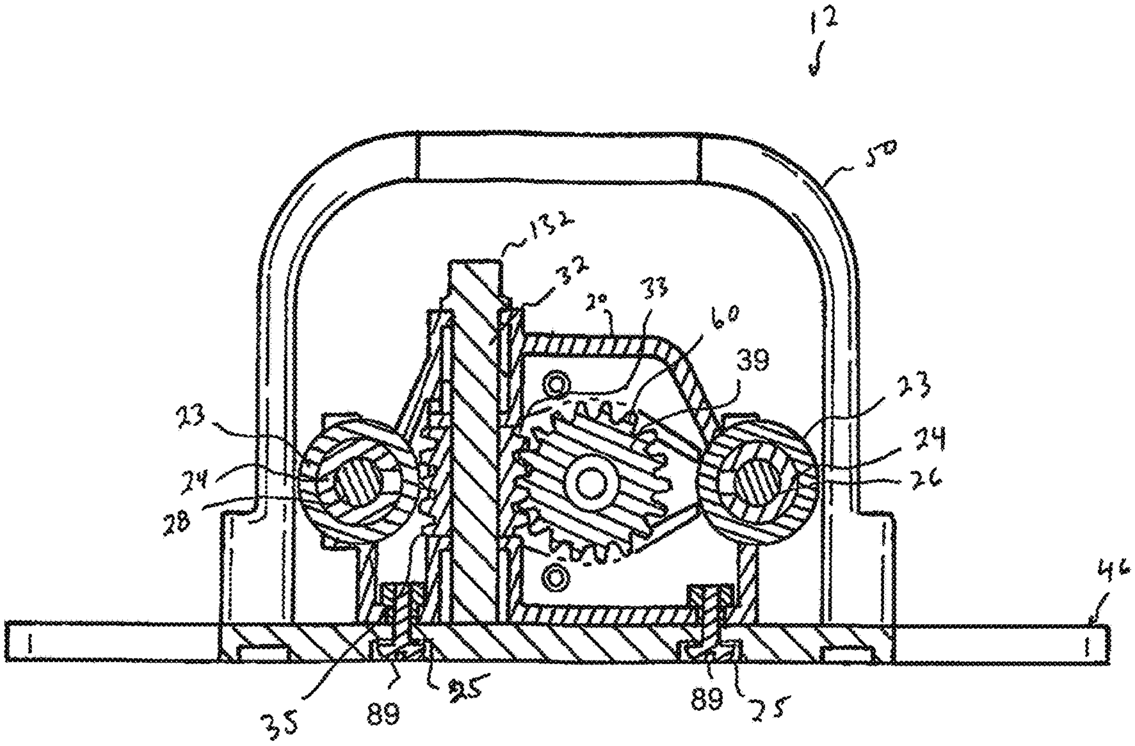
FIG. 10 illustrates a partially transparent front view of an embodiment of the present invention.
Figure 11:
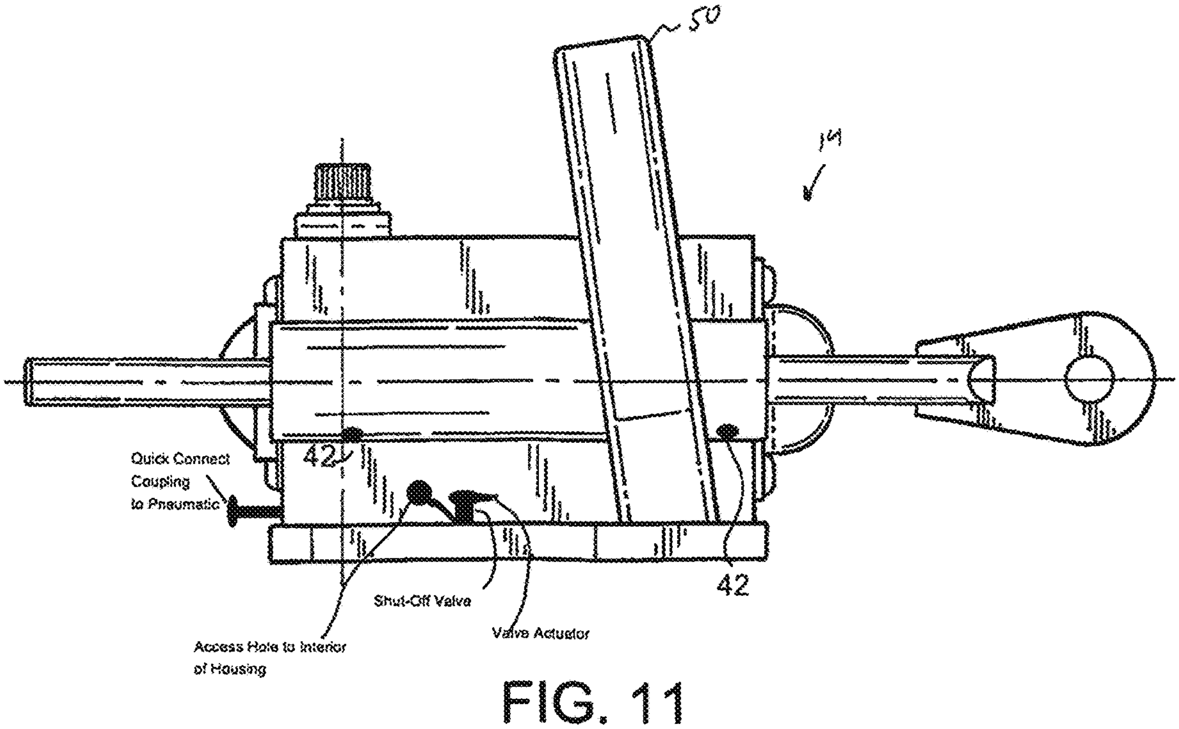
FIG. 11 illustrates a side view of an embodiment of the present invention.

As shown in FIGS. 7 and 8, alternative set up for a joined set of units may be used. Distribution manifold 99 may supply pressure (positive or negative) to one unit, as first unit 12 shown in FIG. 7, or both units, as shown in FIG. 8. Vacuum ejector 87 may be optionally employed, as described above, preferably placing ejector within housing. Shut-off valves 82 may be used at each fitting 92 to provide full control over vacuum cavities in use. Dome 62 may be provided on front side of the housing. An access point, or hole may be driven through face plate, or elsewhere on housing, to provide for pneumatic access to ejector valve placed within housing. Coupler 98 may be a quick connect 97 as is known in the art. Valves may be placed on unit, or along manifold (as shown).

Referring now to FIGS. 9 through 14, the interior mechanism of first unit 12 may be shown. Drive bolt 32 may be set within shaft support 131 with bushing 133. Shaft support is preferably integral with housing and adapted to receive bushing 133. Drive bolt 32 includes threads 35 (preferably spiral gear) to act with worm gear to interact with threaded gear shaft rod 60 via driven worm gear 39 (worm gear mates with spiral gear). Worm gear 39 mounted to drive bolt 32 with a set screw key 43 into keyway groove machined into side of bolt 32. Gear shaft or rod 60 runs the length of housing 20. Housing 20 is mounted on plate 46 via screws 89. Gear shaft is preferably threaded, and may further include a fixedly mounted driven worm gear 39, the gear to interact with drive bolt spiral gear threads 33. Gear shaft 60 also interacts with a preferably threaded mounted actuation yoke 54. Preferably, actuation yoke 54 includes internal threads 55 to allow movement of yoke relative to gear shaft 60 when gear shaft 60 is rotated. Actuation yoke 54 is preferably fixedly attached to arms 26 and 28 (preferably via male nub 57 and arm cavity 58 and described above) so that when drive bolt 32 is rotated, spiral thread 33 interacts with worm gear 39, thereby rotating gear shaft 60, which in turn interacts with actuation yoke 54 to move actuation yoke 54 back-and-forth along gear shaft and thereby modify the lateral placement of arms 26 and 28. By moving arms, the position of the unit may be affected, moving a vacuum connected slab relative the knuckle—thus allowing separation of the jointed mitered edges.

Drive bolt 32 mounted onto shaft support 131 and held in bushing 132, thrust washers 34 set around spiral threads 33. On the opposite side of drive bolt 32, a retaining ring such as snap ring 36 accepts directional force (not axial force), as is known in gearing arts, may be provided to allow for actuation of worm gear 39 via rotation of drive bolt 32. To maintain rod 60, flanged bearing 40 is provided onto rear face plate 64 (and possibly directly mounted onto housing), and face plate 64 is held onto housing via head screws 48. Ball bearing 30 is retained within (preferably flanged) bearing housing 31 to allow for rotation of gear shaft 60. Gear shaft 60 includes cap screw 56 to secure flanged bearing 40. Cap screw 56 is provided on end of gear shaft 60 so as to prevent lateral movement of gear shaft 60 in housing 20. As gear shaft 60 is rotated, actuation yoke will move arms relative to housing.

Figure 12:
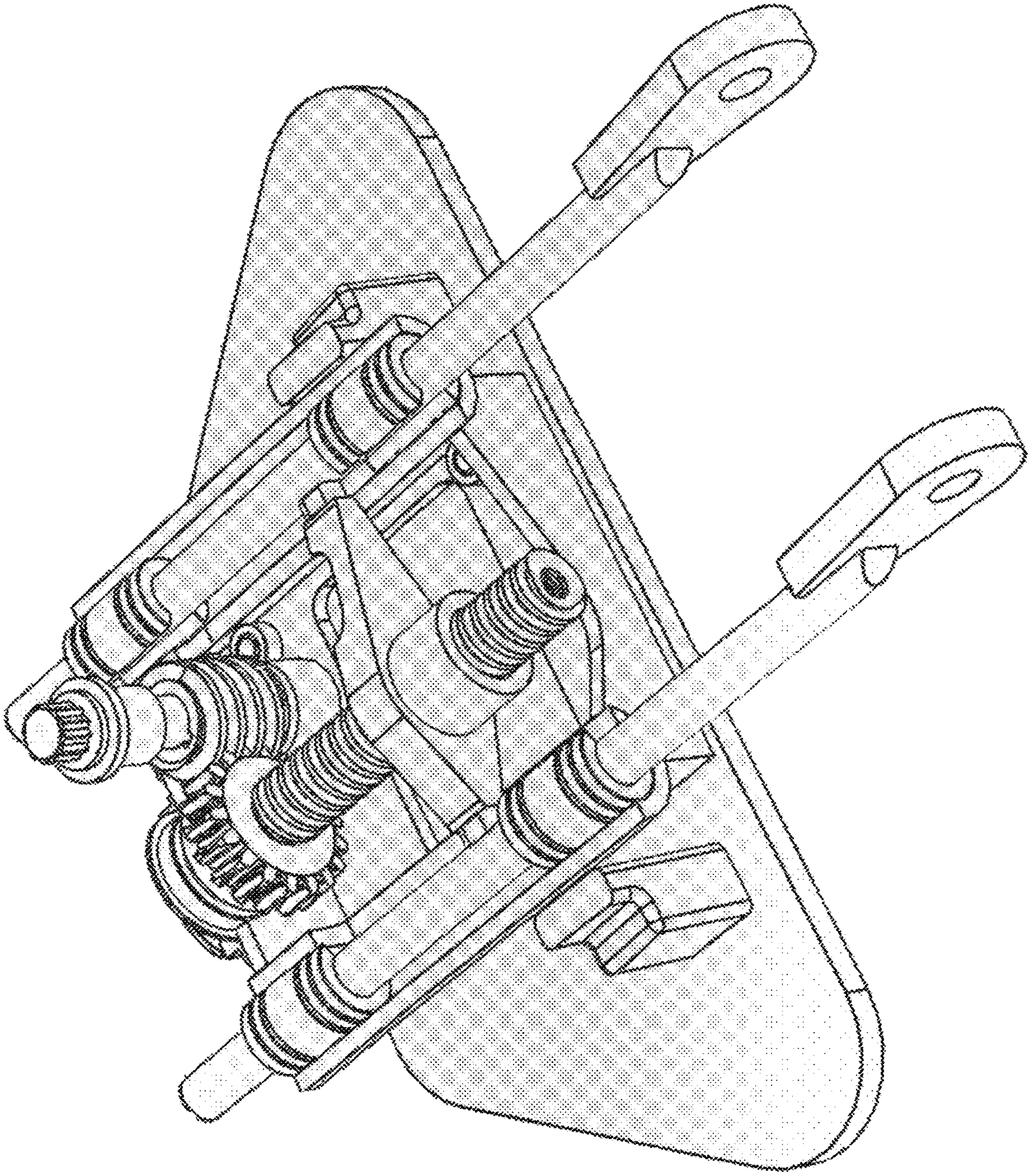
FIG. 12 illustrates a partially transparent top rear perspective view of an embodiment of the present invention.
Figure 13:
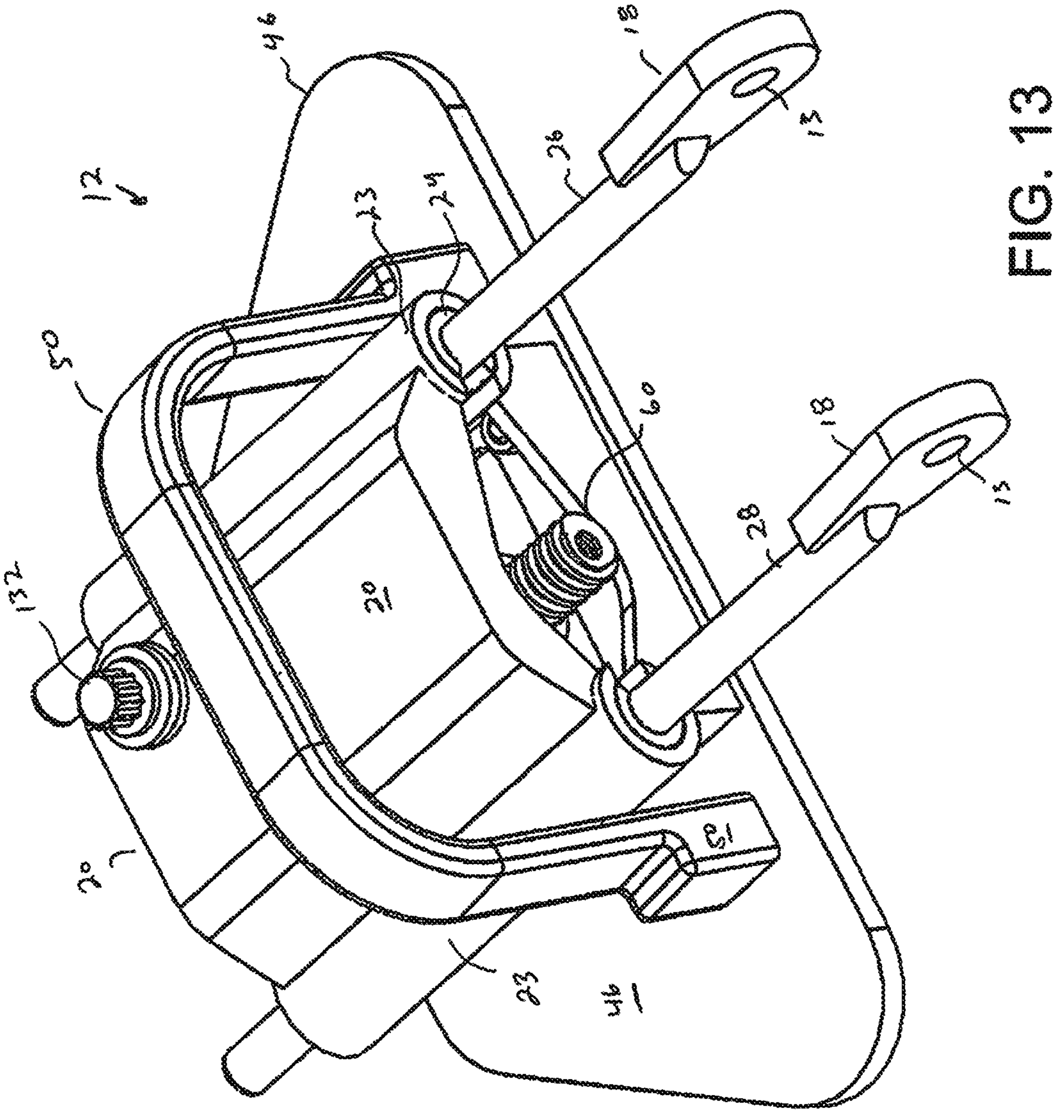
FIG. 13 illustrates a top front perspective view of an embodiment of the present invention.
Figure 14:
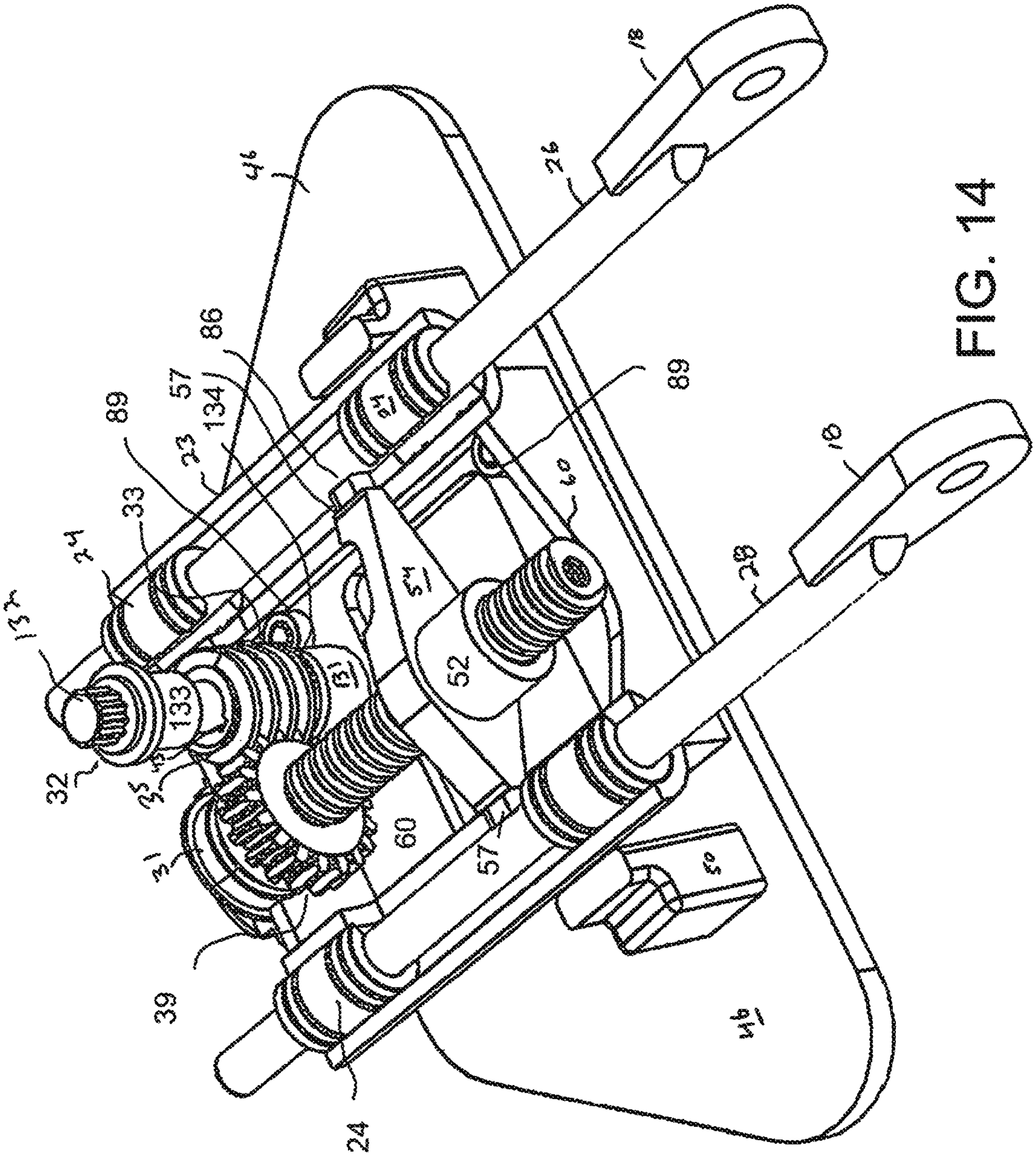
FIG. 14 illustrates a cut-away top front perspective view of the embodiment shown in FIG. 13.

First and second arms 26 and 28 are held within sleeves 23 via linear bearings 24 which surround the arm and allow for lateral movement within sleeve 23. Linear bearings are held in place into sleeve via set screws 42. Referring again to the interior of housing unit as shown in FIG. 12, yoke 54 may include replaceable drive nut 52 with interior threads (such as 55) to engage gear shaft 60. Drive bolt spiral threads 33 are preferably provided interior of housing. In some embodiments, shown in FIG. 10, drive bolt threads 33 remain within housing, while drive bolt 32 may be adjustable and removable upon removal of set screw 43. Drive bolt 32 may include set screw 43 to interact with recessed keyway 44 to assure alignment and fixed connection with drive bolt threads 33. Drive worm may be fixed by set screw into keyway in drive shaft. Cap screw 56 and flange bearing 40 may act as yoke-stop to prevent yoke from continuing past a certain point on housing, and thereby limiting the movement of arms relative to housing. Alternatively, rear back plate 64 acts to stop yoke, or worm gear 39, prevents movement. In front, removable face plate 65 may act as yoke stop on front side. Additionally, one may wish to take apart system, to remove front yoke-stop and so as to leave vacuum housing on a slab while removing the knuckles. The arms and yoke may be slid out of the housing, (preferably after release of knuckle joint) to leave housings and vacuum plates in place. Slab can then be handled, lifted, etc. Arms may be released from housing via release of set screws to allow bearing removal and thereby releasing arms. Arms may wish to be removed when setting of the product plate is finished, or otherwise for maintenance of system or alternate uses.

Figure 17:
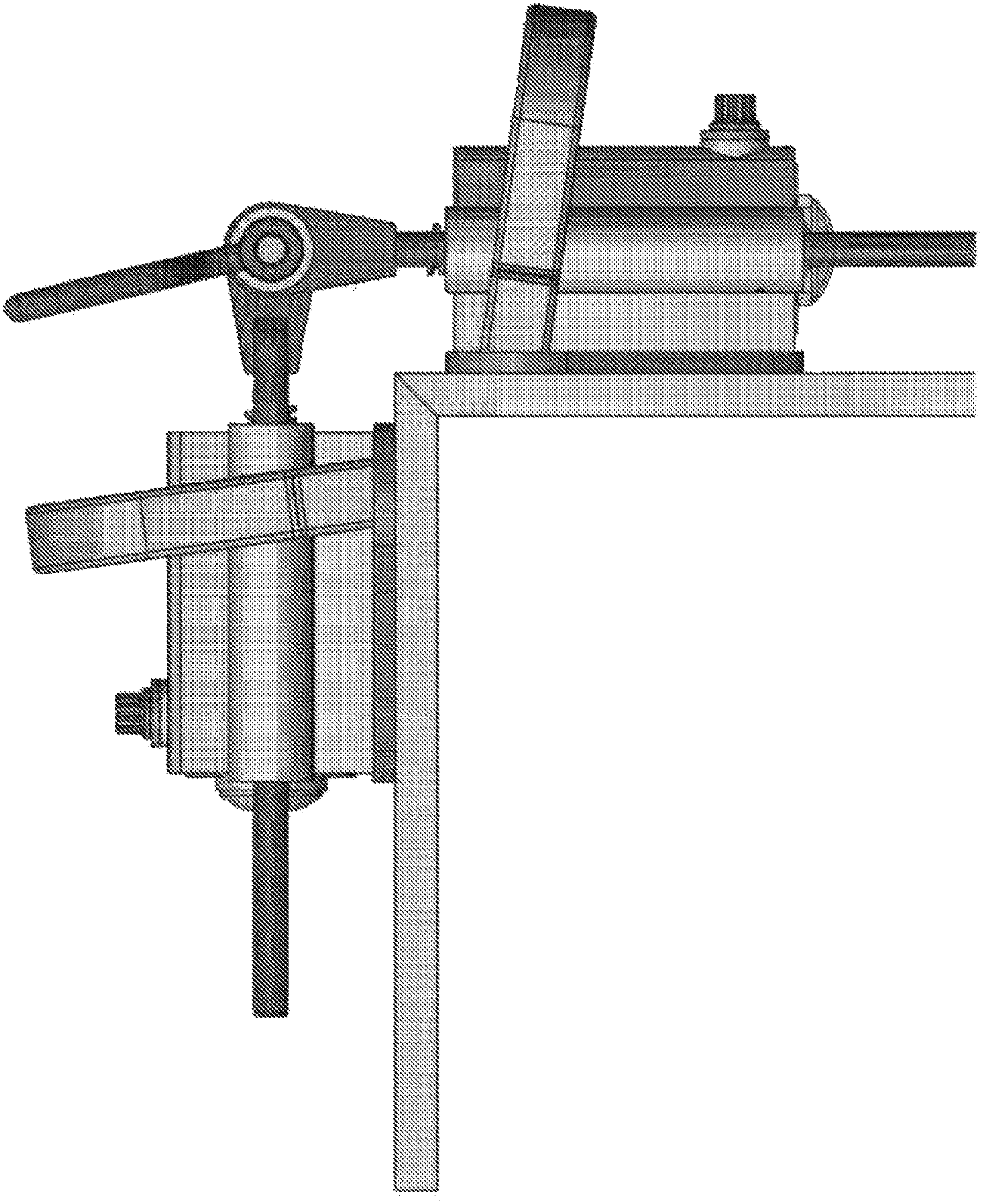
FIG. 17 illustrates a side view of an embodiment of the present invention applied to two slabs at right angle.
Figure 18:
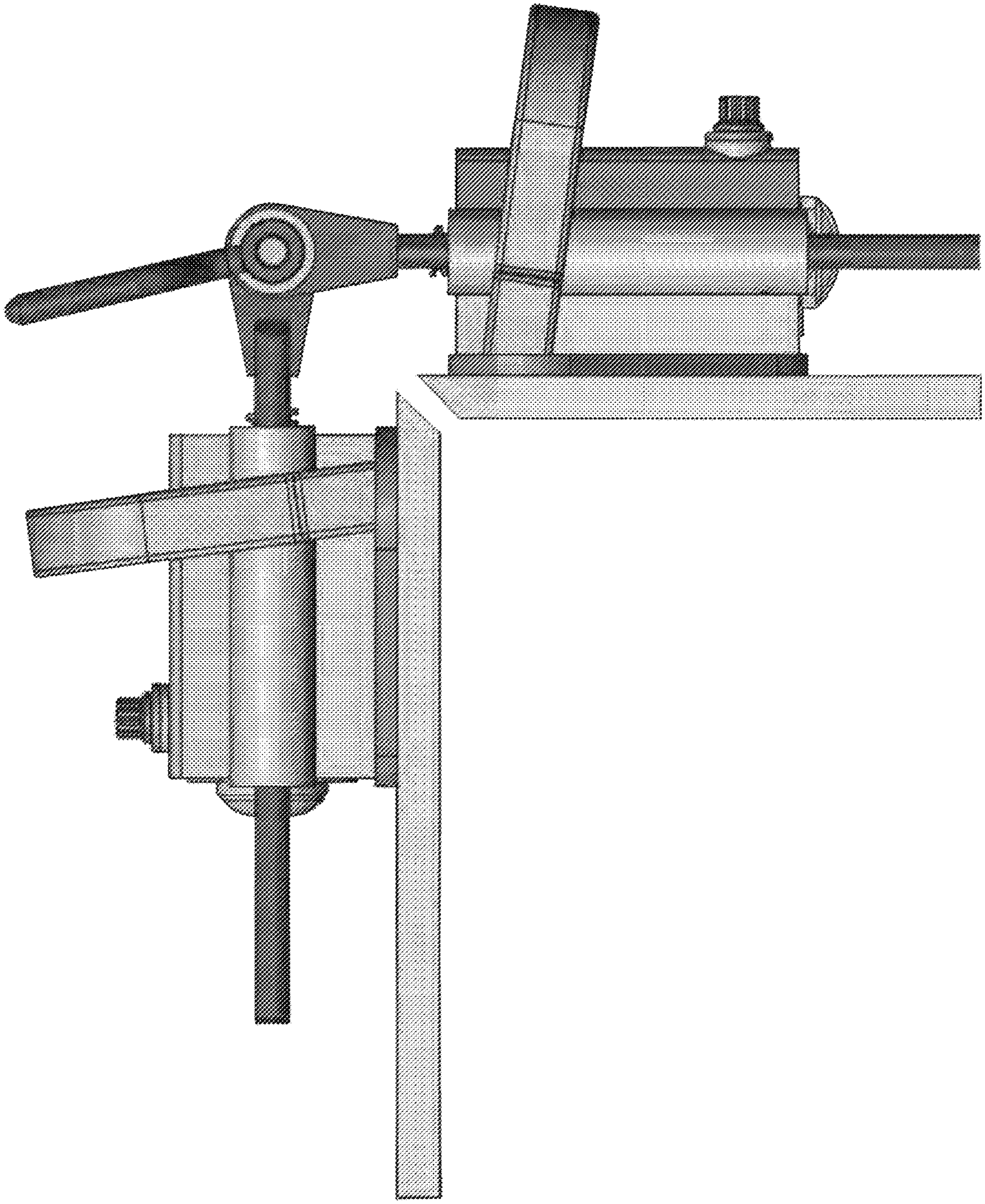
FIG. 18 illustrates a side view of an embodiment of the present invention applied to two slabs at right angle.
Figure 19:
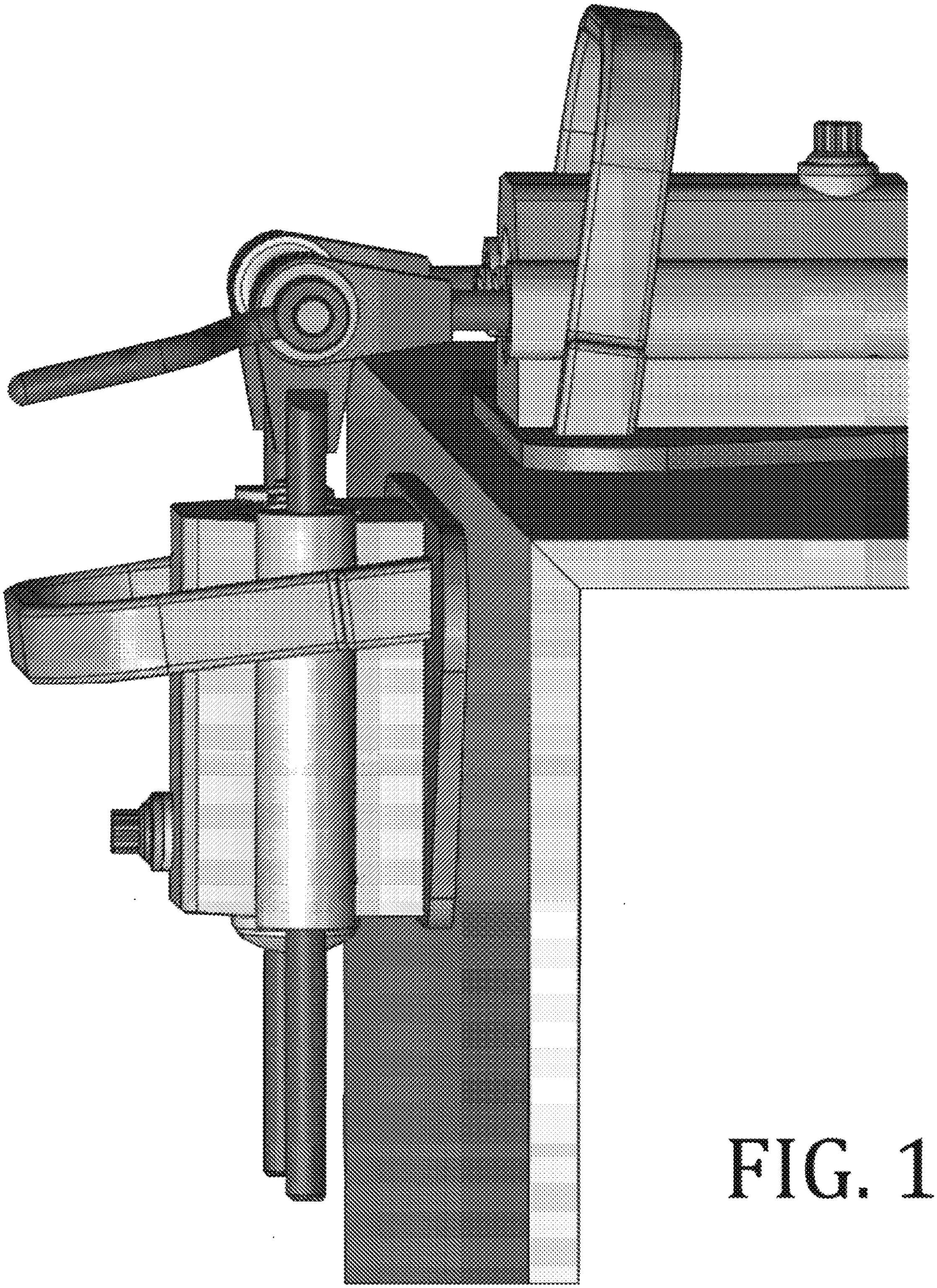
FIG. 19 illustrates a perspective view of an embodiment of the present invention applied to two slabs at right angle.
Figure 20:
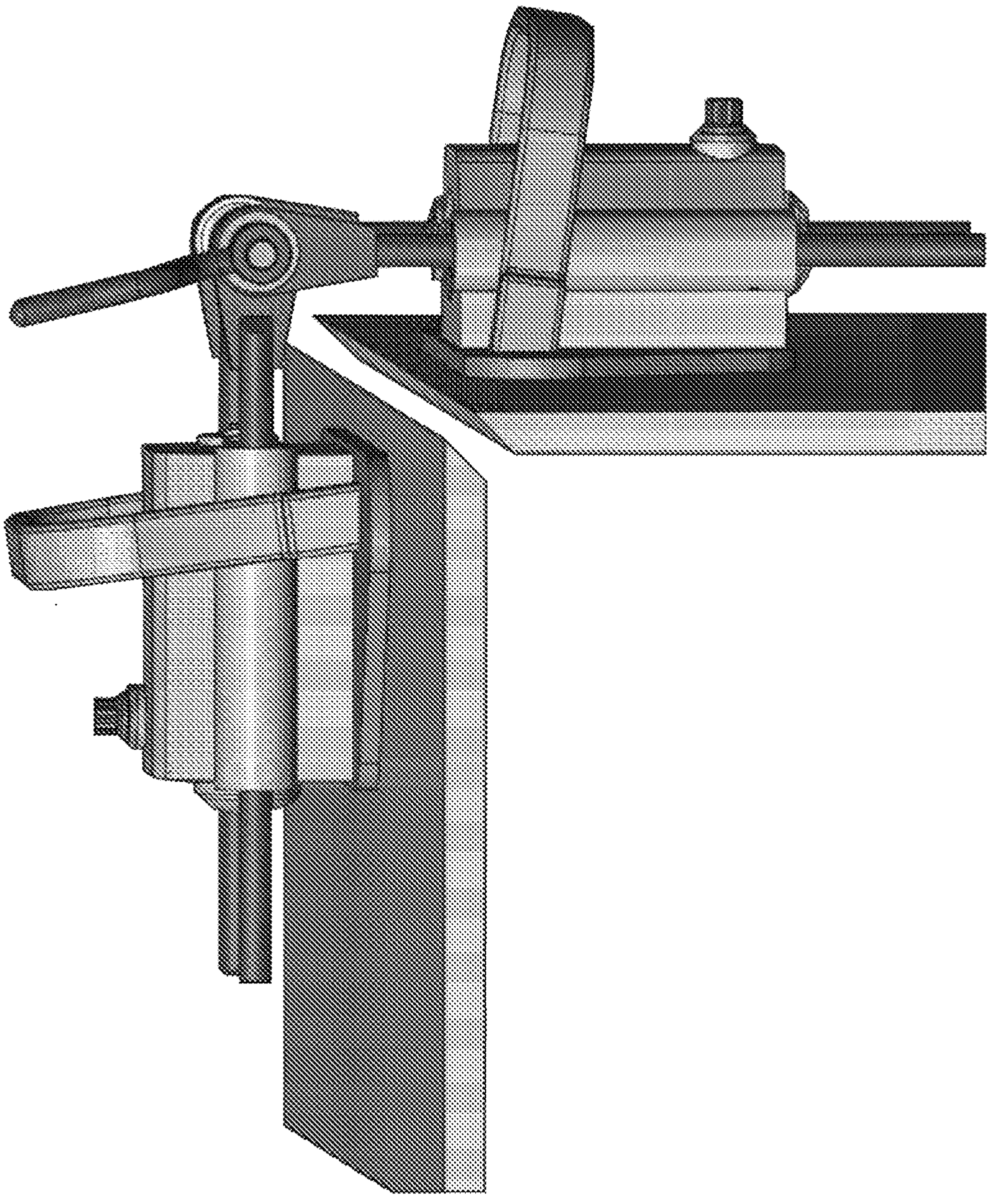
FIG. 20 illustrates a perspective view of an embodiment of the present invention applied to two slabs at right angle.
Figure 21:
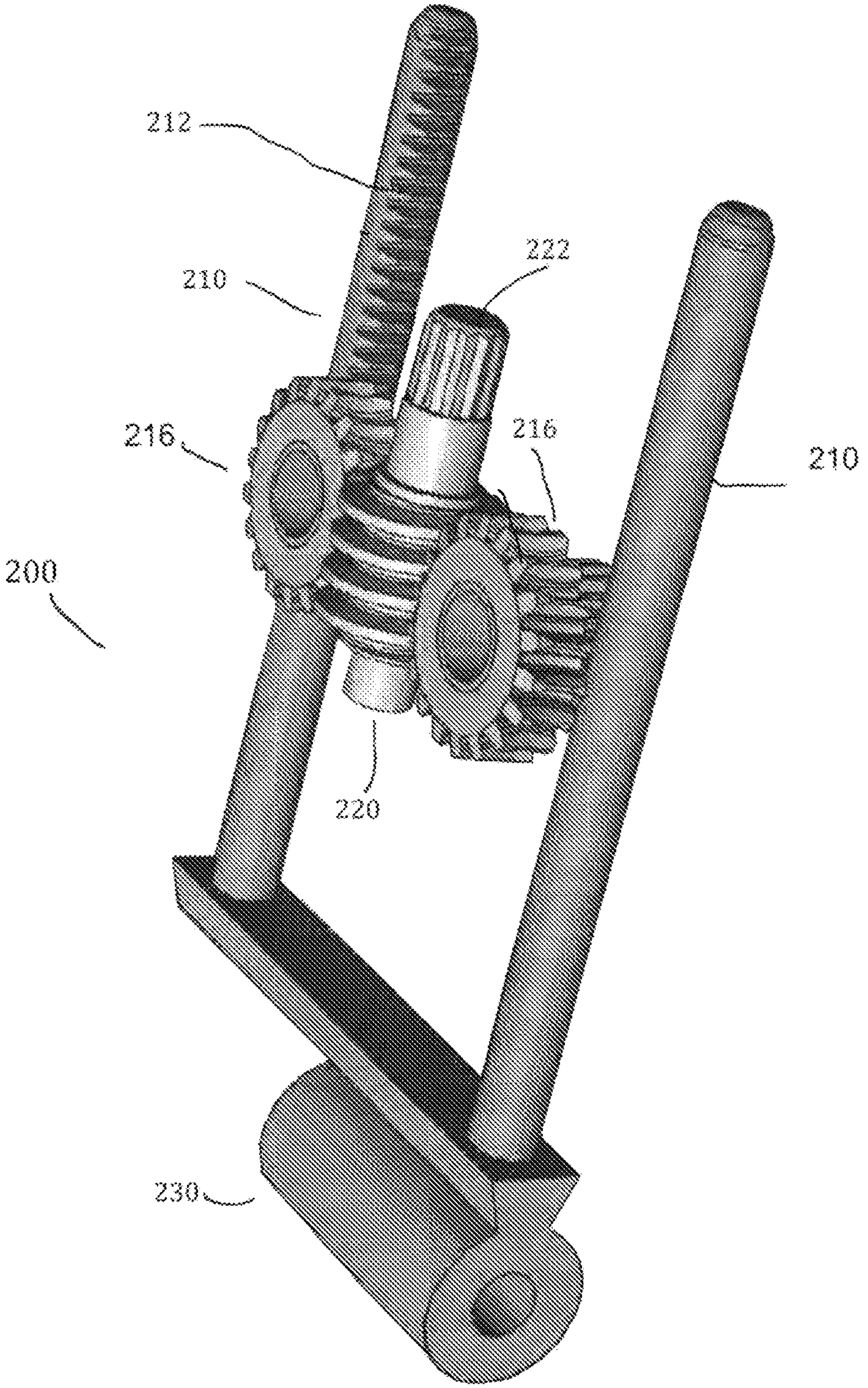
FIG. 21 illustrates a perspective view of an alternative embodiment of the drive mechanism in isolation.

As shown in FIGS. 16 through 20, knuckle 16 provides for a joining of arms in first unit 12 and second unit 14. Note that FIGS. 13, and 17 through 20, demonstrate a version of the invention without a face plate, or with face plate removed. Tabs 18 of arms from both first and second unit align along tab aperture to provide a channel or bore for bolt pin 19 to be set there between. A long nut 17 is provided along bolt pin 19 to provide for loosening and tightening of bolt pin relative to tabs. Handle 117 can be used to manually engage locking of knuckle. Therefore, by rotating long nut 17, the angle by which arms from both first and second units join at knuckle can be locked in position, or released for rotation. Alternatively, handle 117 rotates pin 19 relative nut 17. Pin 19 threaded end to connect to handle and nut secured to pin. Knuckle spacer 119 may be provided and turn tabs around pin to allow tightening and resist arms bending together. As shown in FIGS. 17 and 19, slabs are aligned with mitered edges 3 and 5 in contact. To move from this position to a separated position (as shown in FIGS. 18 and 20), one or more of the drive bolts may be employed to move the vacuum plates (with slab 2 and 4 attached) away from knuckle joint. It is contemplated that both first and second units will be attached to product slabs relative to one another. The distance between each of the first unit and the knuckle will be modified via rotation of the drive bolt and worm gears therein, and the relative angle between two product slabs with both first and second units applied can be modified when long nut releases rotation of knuckle to provide product slabs in correct orientation and thereafter locked in position with long nut to allow for gluing affixing, or otherwise known in the art. Minor modifications of the length of the arms can be made via drive bolt. In addition, it is known that some flex, or outswing, may occur even in the strongest steel arms, possibly by flex of lip seal, and users may accommodate such flex of arms by adjusting angle when applying long nut lock. To resist outswing errors on an angle, such as ninety degrees, the knuckle lock may be locked at a more acute angle, such as eighty-seven to eighty-nine degrees to accommodate outswings. The use of dual bearings along a sleeve and high strength steel in arms will minimize flex of arms.

Figure 15:
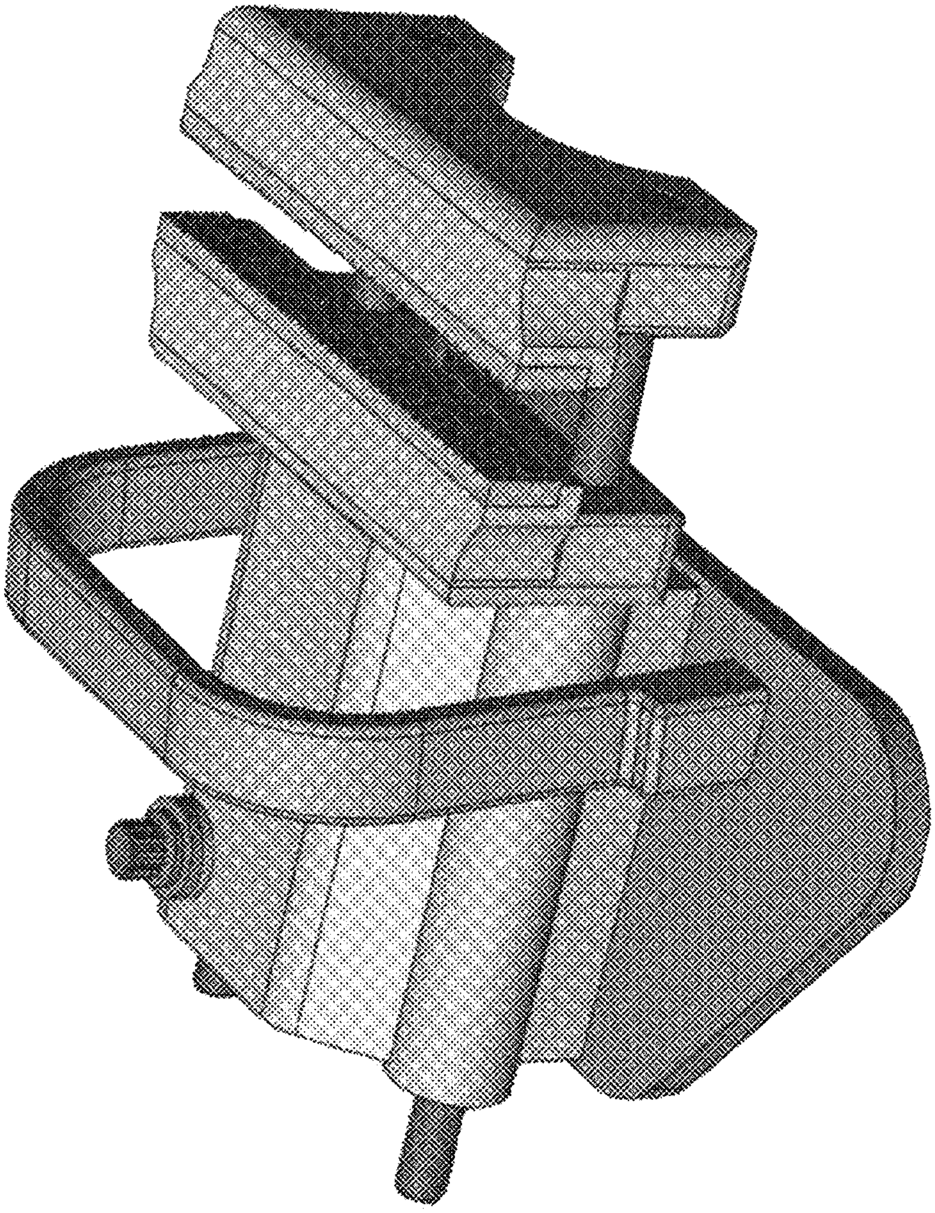
FIG. 15 illustrates a perspective view of a unit with vice alternative option applied to an embodiment of the present invention.
Figure 16:
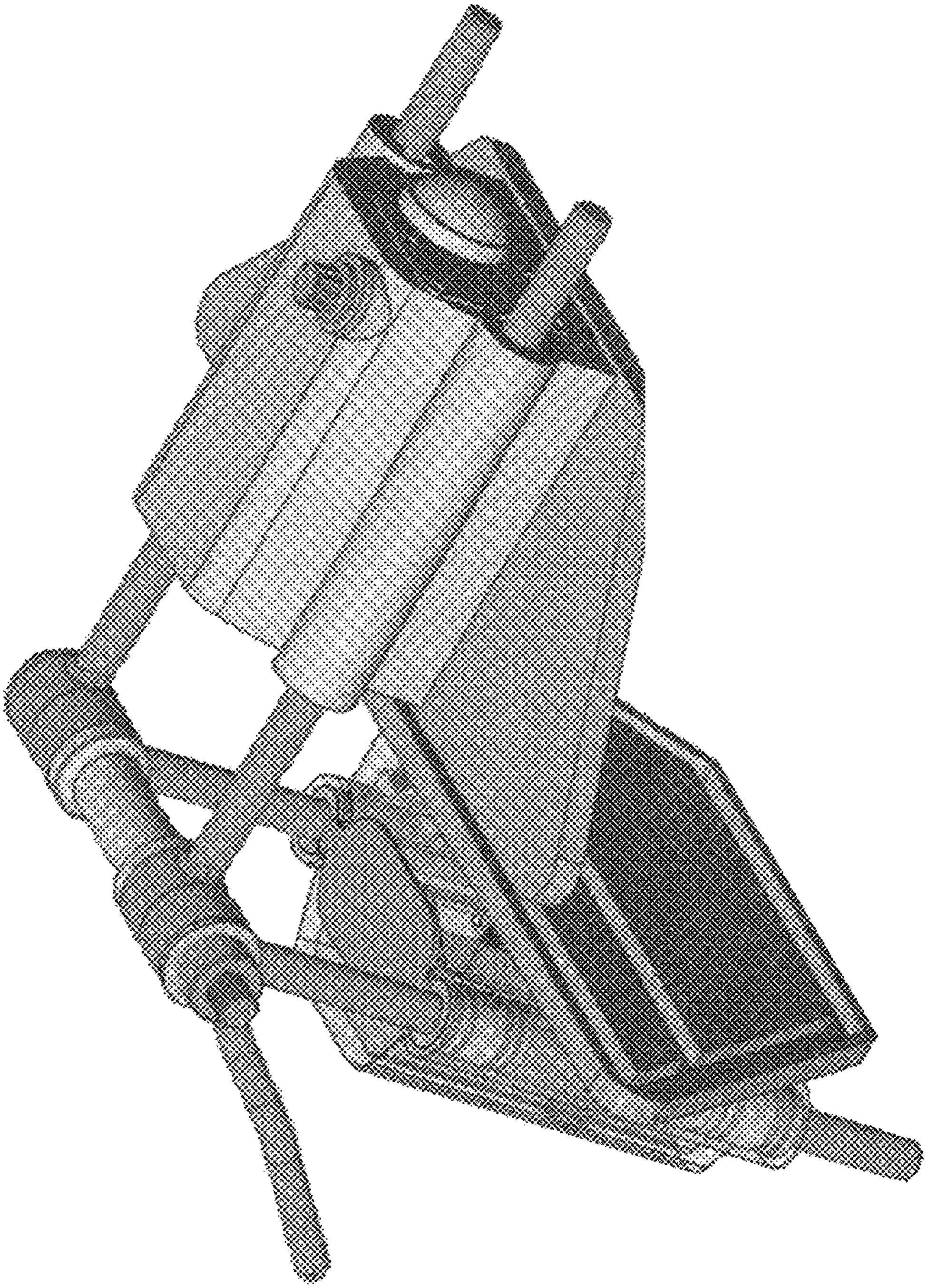
FIG. 16 illustrates a perspective view of a pair of units joined by a knuckle as an embodiment of the present invention.

In addition to use of the knuckle to manipulate the relative location and orientation of two product slabs, one of the first or second units may be used in isolation for a variety of accessories. For instance, as shown in FIG. 15, alternative items may be placed onto arms. In other embodiments, alternative accessories may be mounted onto plate 46 via accessory mount cavities 89. As shown in FIG. 15, a vice 100 may be applied. Vice includes near mount jaw 102 and far mount jaw 105. Vice near mount 102 can be placed over extended arms 15 via channels 103. Vice near mount can then be fixedly mounted onto arms as is known in the art. Otherwise, it is that near mount is slidably engaged with arms 15 so as to allow a modification of the opening of a vice, as is known in the art. When pressure is applied to vice, near mount will be pressed up against housing. Far mount 105 may be placed over tabs 18 in arms 15 and affixed thereto via pins 106, pin 19 may also be used through tabs accommodating alternate accessory such as far mount. Therefore, by adjusting the length of arms with the drive bolt 32, a vice can be provided to hold items. Additionally, a vacuum may be applied via tubing 83 and fittings 92 whereby first unit 12 may be applied to a large slab and fixed thereto and the unit with vice can be used as a standard vice.

Figure 22:
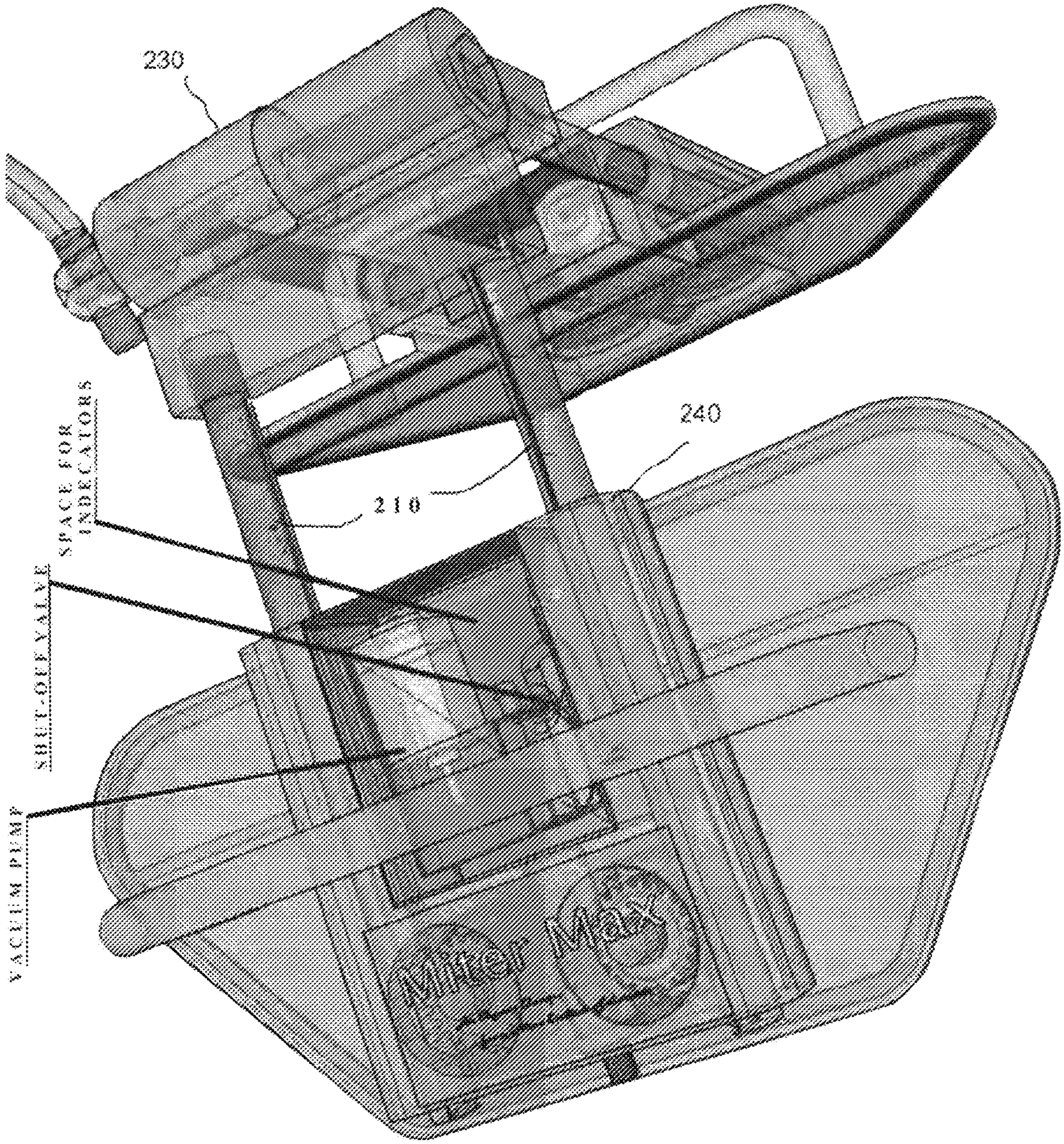
FIG. 22 illustrates a partially transparent perspective view of an embodiment of the present invention with drive mechanism shown in FIG. 21, at right angle.
Figure 23:
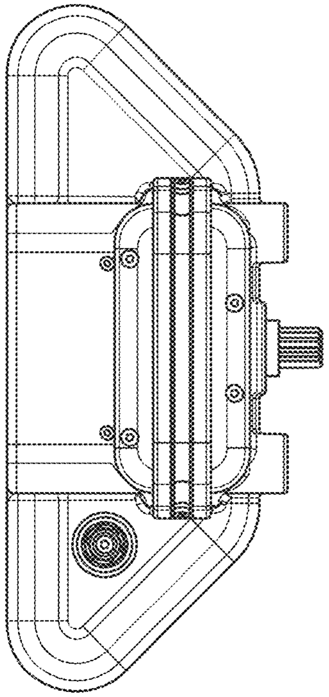
FIG. 23 illustrates a top view of a single partial unit of an embodiment of the present invention with drive system as shown in FIG. 21.
Figure 24:
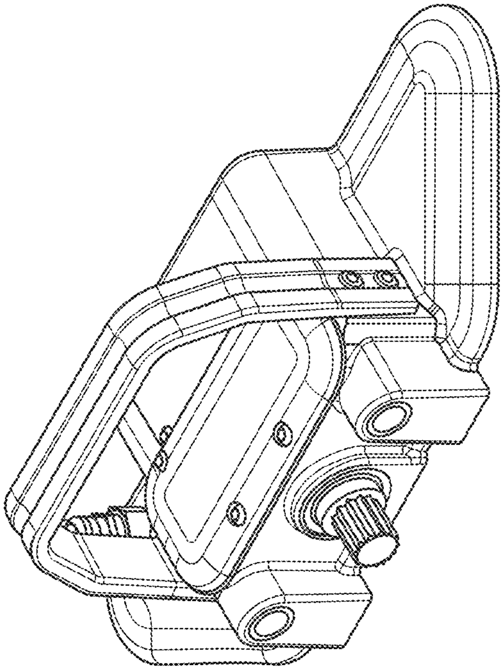
FIG. 24 illustrates a top rear perspective view of a single partial unit of an embodiment of the present invention.
Figure 25:
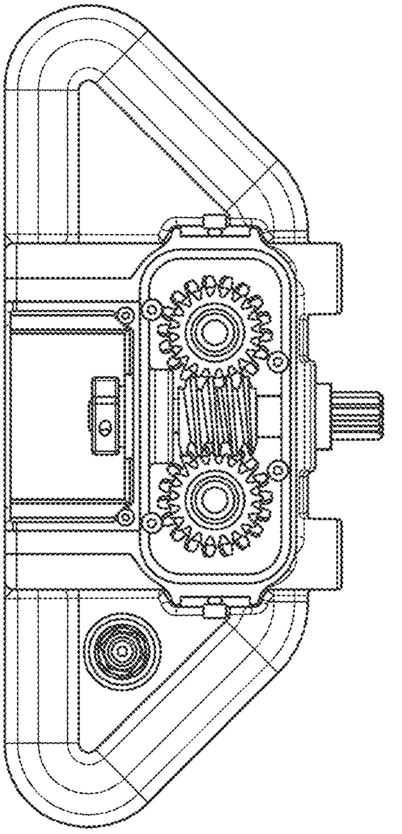
FIG. 25 illustrates a partially cut-away top view of a single partial unit of an embodiment of the present invention.
Figure 26:
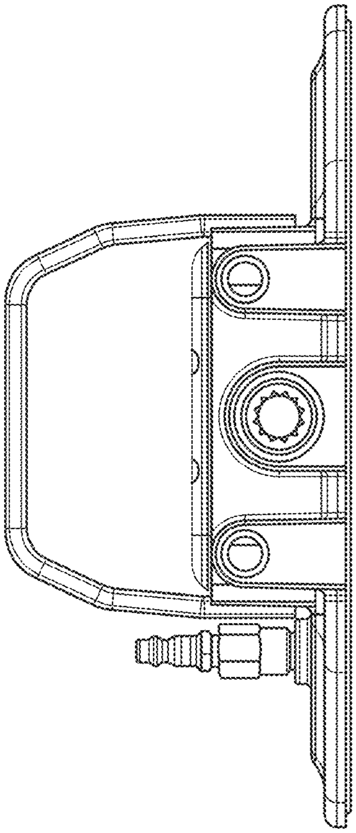
FIG. 26 illustrates a front plan view of a single partial unit of an embodiment of the present invention.
Figure 27:
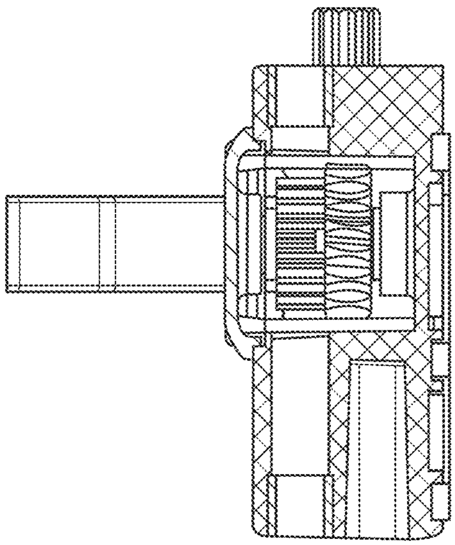
FIG. 27 illustrates a partially cut-away side plan view of a single partial unit of an embodiment of the present invention.
Figure 28:
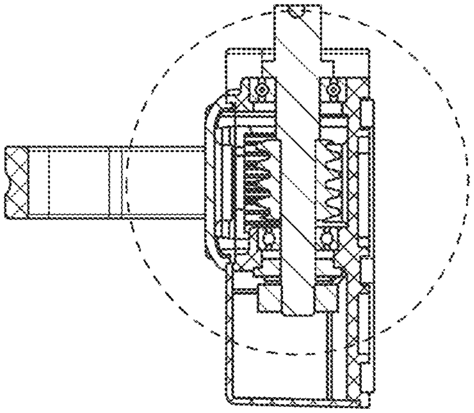
FIG. 28 illustrates a cross-sectional side plan view of a single partial unit of an embodiment of the present invention.
Figure 29:
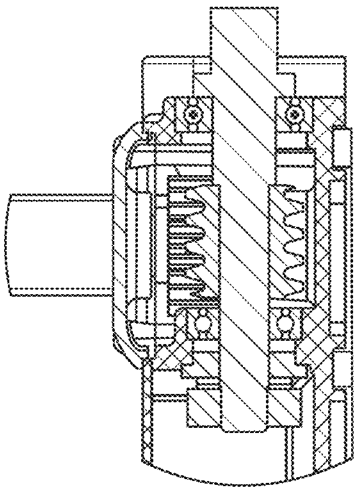
FIG. 29 illustrates an enlarged view of the cross-sectional view of FIG. 28.
Figure 30:
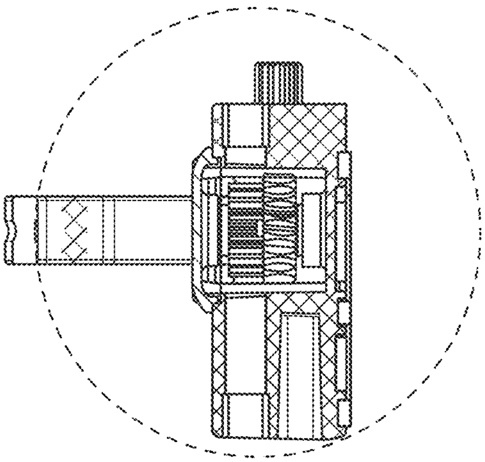
FIG. 30 illustrates a narrowed partial cut-away view of FIG. 27.
Figure 31:
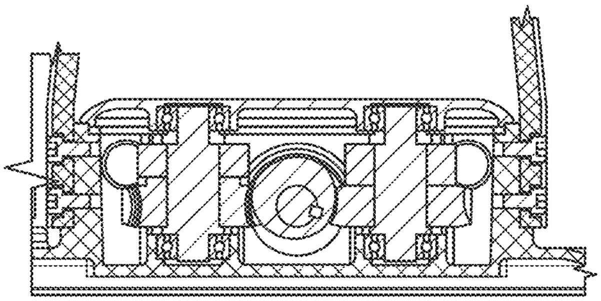
FIG. 31 illustrates a cross-sectional rear plan view of a single partial unit of an embodiment of the present invention.
Figure 32:
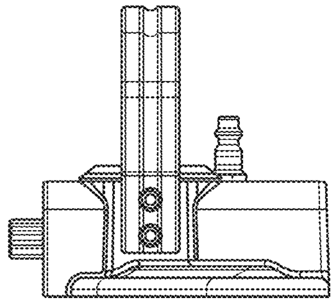
FIG. 32 illustrates a side plan view of a single partial unit of an embodiment of the present invention.
Figure 33:
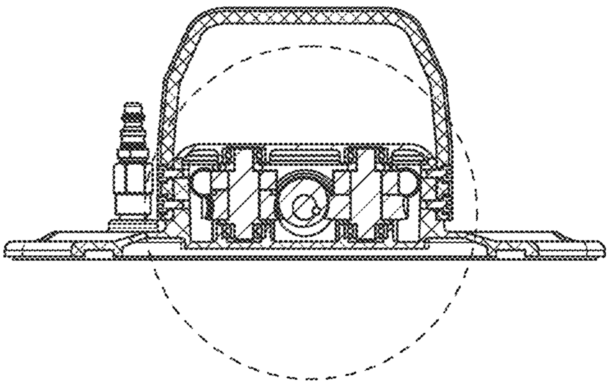
FIG. 33 illustrates a partially cut-away front plan view of a single partial unit of an embodiment of the present invention.

As shown in FIGS. 21 through 33, an alternative drive mechanism 200 may be employed. Drive worm gear 220 may be set in parallel with arms 210 so that the front face of the body may frame the gear knob 222. Gears 216 engage worm drive gear 220 to drive arms 210 via teeth of gears 216 engaging racks 212 set on arms 210 to push arms against joint or knuckle 230. As seen in FIG. 22, additional items such as a vacuum pump, shut off valve and space indicators may be framed within body 240.

As shown in FIGS. 23 through 33, thrust bearing pack may engage radial thrust bearing against locking collar. Worm gear drives drive shaft (or arm). Worm gear engages spur gear, spur gear used to drive arms. An oil impregnated guide bushing may be employed on the front side and back side to hold arms. Vacuum seal is provided against the worked surface to fix position of body relative to worked surface. A quick connect fitting is preferred and preferably includes a check valve. A die cast cover may be employed over top to seal body via cover clamping screws, with cover set over optional cove gasket against frame of body. Worm gears drive both gear shafts to rotate the spur gear to drive arms. Gear shaft is preferably held by radial thrust bearings set on grind washers.

I claim:

1. A method for aligning two slabs against one another to prepare a mated miter edge, said method comprising the steps of:

a. affixing a first vacuum plate to a first slab;

b. further affixing a second vacuum plate to a second slab;

c. coupling the first and second vacuum plates via arms extending from each of said vacuum plates together into a knuckle;

d. turning a worm gear coupled with the first vacuum plate to cause linear motion of the first vacuum plate relative the knuckle; and e. causing linear motion of the first vacuum plate relative the knuckle.

2. The method of claim 1 wherein said step of turning causes the first and second slabs to move together.

3. The method of claim 2 further comprising the step of further turning the worm gear in an opposite direction so as to move the first and second slabs apart.

4. The method of claim 1 wherein said step of turning comprises activation of a motor coupled to the worm gear.

5. The method of claim 4 wherein said step of turning causes two separate motors to turn a first and second worm gear coupled to each of the first and second vacuum plates.

6. A method for aligning two slabs against one another to prepare a mated miter edge, said method comprising the steps of:

a. affixing a first vacuum plate to a first slab;

b. further affixing a second vacuum plate to a second slab;

c. coupling the first and second vacuum plates via arms extending from each of said vacuum plates together into a knuckle;

d. causing linear motion of the first vacuum plate relative the knuckle;

wherein the vacuum plate includes two separate cavities on the plate underside, and wherein said step of affixing comprises sealing a first cavity and a second cavity against the slab.

7. The method of claim 6 further comprising the step of closing a shut-off valve so as to release the vacuum seal from the second cavity, while maintaining the vacuum seal on the first cavity.

8. A method for aligning two slabs against one another to prepare a mated miter edge, said method comprising the steps of:

a. affixing a first vacuum plate to a first slab;

b. further affixing a second vacuum plate to a second slab;

c. coupling the first and second vacuum plates via arms extending from each of said vacuum plates together into a knuckle;

d. causing linear motion of the first vacuum plate relative the knuckle;

rotating the two vacuum plates relative one another about the knuckle.

9. A method for aligning two slabs against one another to prepare a mated miter edge, said method comprising the steps of:

a. affixing a first vacuum plate to a first slab;

b. further affixing a second vacuum plate to a second slab;

c. coupling the first and second vacuum plates via arms extending from each of said vacuum plates together into a knuckle;

d. causing linear motion of the first vacuum plate relative the knuckle;

whereby the step of causing linear motion comprises coupling a threaded drive rod to a drive bolt perpendicular one another, rotating the drive bolt, and translating rotational movement of the drive rod into lateral movement of an arm relative the knuckle.

10. A method for aligning two slabs against one another to prepare a mated miter edge, said method comprising the steps of:

a. affixing a first vacuum plate to a first slab;
b. further affixing a second vacuum plate to a second slab;
c. coupling the first and second vacuum plates via arms extending from each of said vacuum plates together into a knuckle;
d. causing linear motion of the first vacuum plate relative the knuckle;

whereby said step of affixing comprises mating an underside of the vacuum plate to a surface of a slab via a first cavity in the underside, whereby the underside includes at least a first cavity and a second cavity separated by a seal bar isolating the first cavity from said second cavity.

11. The method of claim 10 whereby said step of affixing comprises coupling a first vacuum tube in fluid communication with the first cavity, and coupling a second vacuum tube in fluid communication with the second cavity; and isolating the second cavity via closing a shut-off valve along the second vacuum tube.

12. A method for aligning two slabs against one another to prepare a mated miter edge, said method comprising the steps of:

a. affixing a first vacuum plate to a first slab;
b. further affixing a second vacuum plate to a second slab;
c. coupling the first and second vacuum plates via arms extending from each of said vacuum plates together into a knuckle;
d. causing linear motion of the first vacuum plate relative the knuckle;

whereby said step causing linear motion is driven by a motor coupled to a drive gear along an arm.

13. The method of claim 12 further comprising the step of receiving a communication in a telecommunications receiver coupled to a vacuum plate housing.

14. The method of claim 13 further comprising a second step of further causing linear motion driven by a second motor coupled to a second drive gear along a second arm.

15. The method of claim 14 whereby said step of causing linear motion is conducted in a first plane parallel to a first slab and said step of further causing linear motion is conducted in a second plane parallel to a second plane, whereby said first and second planes are offset by at least five degrees.

16. The method of claim 14 whereby said step of causing linear motion is conducted in a first plane parallel to a first slab and said step of further causing linear motion is conducted in a second plane parallel to a second plane, whereby said first and second planes are parallel.

* * * * *